United States Patent
Reese et al.

(10) Patent No.: US 10,723,829 B2
(45) Date of Patent: Jul. 28, 2020

(54) PRODUCT-TO-PRODUCT PROCESS FOR PREPARATION OF LOW VISCOSITY POLYOXYALKYLENE POLYOLS

(71) Applicants: Covestro LLC, Pittsburgh, PA (US); Covestro Deutschland AG, Leverkusen (DE)

(72) Inventors: Jack R. Reese, Coraopolis, PA (US); Edward P. Browne, Köln (DE); Yue Yang, Canton, MI (US); Jose F. Pazos, Charleston, WV (US)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/582,132

(22) Filed: Sep. 25, 2019

(65) Prior Publication Data

US 2020/0199285 A1 Jun. 25, 2020

Related U.S. Application Data

(60) Provisional application No. 62/781,867, filed on Dec. 19, 2018.

(51) Int. Cl.
*C08G 18/48* (2006.01)
*C08G 65/26* (2006.01)

(52) U.S. Cl.
CPC ..... *C08G 18/4804* (2013.01); *C08G 65/2663* (2013.01)

(58) Field of Classification Search
CPC .......... C08G 18/4804; C08G 65/2663
USPC .......... 521/27
See application file for complete search history.

(56) References Cited

U.S. PATENT DOCUMENTS

| | | |
|---|---|---|
| 3,427,334 A | 2/1969 | Belner |
| 3,941,849 A | 3/1976 | Herold |
| 4,477,589 A | 10/1984 | van der Hulst et al. |
| 5,158,922 A | 10/1992 | Hinney et al. |
| 5,470,813 A | 11/1995 | Le-Khac |
| 5,482,908 A | 1/1996 | Le-Khac |
| 5,689,012 A * | 11/1997 | Pazos .............. C08G 65/2696 568/619 |
| 5,919,988 A * | 7/1999 | Pazos .............. C08G 65/2663 568/679 |
| 6,077,978 A | 6/2000 | McDaniel et al. |
| 7,919,575 B2 | 4/2011 | Browne |
| 2011/0230581 A1 * | 9/2011 | Klescewski ........ C08G 65/2663 521/174 |
| 2017/0137569 A1 * | 5/2017 | Hofmann ............... C08G 64/34 |

OTHER PUBLICATIONS

M. Ionescu, "Chemistry and Technology of Polyols for Polyurethanes", 2nd Edition, vol. 1, 2016, pp. 189-190.

* cited by examiner

*Primary Examiner* — Michael Bernshteyn
(74) *Attorney, Agent, or Firm* — N. Denise Brown

(57) ABSTRACT

This invention relates to a process for preparing low viscosity polyoxyalkylene polyols (P) that have a narrow molecular weight distribution. This process comprises reacting a H-functional starter substance ($S_i$), a H-functional starter substance ($S_x$) and a H-functional starter substance ($S_c$) with one or more alkylene oxides in the presence of a double metal cyanide catalyst. The resultant polyoxyalkylene polyols (P) have a functionality of 2 to 8 and a hydroxyl number of 5 to 35 mg KOH/g polyol.

25 Claims, 4 Drawing Sheets

PRODUCT-TO-PRODUCT PROCESS FOR PREPARATION OF LOW VISCOSITY POLYOXYALKYLENE POLYOLS

FIELD OF THE INVENTION

This invention relates to an improved process for preparing low viscosity polyoxyalkylene polyols (P). These polyoxyalkylene polyols (P) have a functionality of 2 to 8 and a hydroxyl (OH) number of from 5 mg KOH/g to 35 mg KOH/g. This invention also relates to an improved process that eliminates the need to use a polyether polyol of lower molecular weight to produce a polyether polyol of higher molecular weight by using a starter charge of the targeted polyether polyol product and a low equivalent weight starter substance as the initial polyether polyol starter mixture.

BACKGROUND

A challenge with the commercial production of DMC catalyzed polyols is the inability to directly use low equivalent weight starter substances such as propylene glycol, dipropylene glycol and glycerin as the main component of the starter mixture. These low equivalent weight starter substances inhibit the catalytic activity of the DMC catalyst when present as the main component of the starter mixture for the production of a semi-batch DMC catalyzed polyether polyol. Starting a reaction with such low equivalent weight starter substances also requires special commercial equipment as the amount of starter required to make higher equivalent weight products is small. For example, when making a 500 equivalent weight propylene glycol started polyether polyol, 7.5 weight percent propylene glycol is required as the low equivalent weight starter. However, when making a 4000 equivalent weight propylene glycol started polyether polyol, only 0.95 weight percent propylene glycol is required as the low equivalent weight starter. Therefore, the preparation of a 4000 equivalent weight propylene glycol started polyether polyol requires a large reaction build ratio. The reaction build ratio is defined as the product equivalent weight divided by the starter equivalent weight (EW). Thus, for a propylene glycol started 500 EW polyether polyol, the reaction build ratio would be 500/38 or 13.2. By comparison, in the case of a 4000 EW polyether polyol the build ratio would be 4000/38 or 105. This large reaction build ratio would require special reaction equipment to handle the low amount of starter required at the start of the process. The minimum reactor charge is dictated by the mixing configuration (i.e. touching or covering lowest most agitator blade) and the heating requirements (i.e. covering sufficient surface area for jacketed or internal heating/cooling systems or filling the external recirculation loop for external heating/cooling systems). The industry has overcome this challenge of the commercial production of products having a wide range of equivalent weights by making and storing starter polyether polyols that can cover the whole range of products to be made. Typically, this may require more than one starter polyether polyols be stored. One starter polyether polyol to make low to intermediate equivalent weight products (having hydroxyl numbers of 112 to 28 mg KOH/g polyol) and another starter polyether polyol to make higher equivalent weight products (having hydroxyl numbers of <28 mg KOH/g polyol). As one skilled in the art will recognize these starter polyether polyols, referred to herein as low equivalent weight starter polyether polyols, are lower in equivalent weight than the targeted polyether polyol product but higher in equivalent weight than the initial low equivalent weight starter substance (i.e., propylene glycol, dipropylene glycol, glycerin, etc.) and are initially charged to the reactor to provide the minimum charge required for the reactor configuration. The storage of these low equivalent weight starter polyether polyols and preparation of them in the reactor systems takes away from resources to make the finished products. Therefore, there is a need to eliminate these low equivalent weight starter polyether polyols.

SUMMARY

The present invention is directed to a process for the preparation of polyoxyalkylene polyols (P) having a functionality of 2 to 8 and a hydroxyl number of from 5 mg KOH/g polyol to 35 mg KOH/g polyol by reaction of H-functional starter substances ($S_i$), ($S_c$) and ($S_x$) with one or more alkylene oxide(s) in the presence of a double metal cyanide catalyst (DMC). This process comprises ($\alpha$) forming a starter mixture comprising the H-functional starter substance ($S_i$), the H-functional starter substance ($S_x$) and the double metal cyanide catalyst, and, optionally, stripping said starter mixture under vacuum, ($\gamma$) continuously adding (a) an alkylene oxide to the starter mixture of step ($\alpha$);

and ($\delta$) continuously adding the H-functional starter substance ($S_c$);

wherein:

steps ($\gamma$) and ($\delta$) either start simultaneously or step ($\gamma$) starts before step ($\delta$);

(ii) the theoretical functionality of the H-functional starter substance ($S_i$) is identical to the theoretical functionality of the polyoxyalkylene polyol (P) and the measured hydroxyl number of the H-functional starter substance ($S_i$) is within 10% of the measured hydroxyl number of the polyoxyalkylene polyol (P);

(iii) the H-functional starter substance ($S_x$) has an equivalent weight greater than 10 Da and of less than or equal to 250 Da;

(iv) the H-functional starter substance ($S_c$) has an equivalent weight of greater than 10 Da and less than or equal to 70 Da;

(v) in step ($\delta$) the continuous addition of the H-functional starter substance ($S_c$) is stopped when from 30 weight percent to 99 weight percent of the total weight of alkylene oxide added in step ($\gamma$) has been added;

and (vi) the hydroxyl numbers are determined by ASTM D4274-11.

The process of the invention may additionally comprise:

($\beta$) adding an activation amount of (b) one or more alkylene oxide(s) to the starter mixture of step ($\alpha$), wherein in step ($\gamma$) the continuous addition of (a) the alkylene oxide is to the mixture formed in ($\beta$);

and (v) in step ($\delta$) the continuous addition of the H-functional starter substance ($S_c$) is stopped when from 30 to 99 weight percent of the total alkylene oxide added in steps ($\beta$) and ($\gamma$) has been added.

The present invention also relates to a process for producing DMC catalyzed polyoxyalkylene polyols with narrow (i.e. symmetrical or a distribution where the left side of the distribution mirrors the right side or the distribution is not skewed to one side or the other and has no second peaks or shoulders on one side or both sides) molecular weight distributions and low viscosities, and provides an efficient process to make such polyoxyalkylene polyols by eliminating a dedicated low equivalent weight starter polyether polyol and only using a low equivalent weight starter substance mixed with a polyoxyalkylene polyether substance that has a similar hydroxyl number, functionality and composition of the product to be produced as the starter mixture. This may be referred to as a "product to product" process in which the starter mixture comprises the same product that is being prepared and a low equivalent weight substance. In addition, the novel process is sustainable (i.e. short cycle times, low quantities of catalyst, reduced energy consumption, etc.) and it forms a high quality polyol product (i.e. a product having a narrow molecular weight distribution and a low viscosity).

It is an object of the present invention to provide a process for the preparation of polyoxyalkylene polyols that exhibit good viscosity and polydispersity, without the need to produce and have a separate storage tank for the low equivalent weight starter polyether polyol.

DETAILED DESCRIPTION OF THE INVENTION

Figure 1:
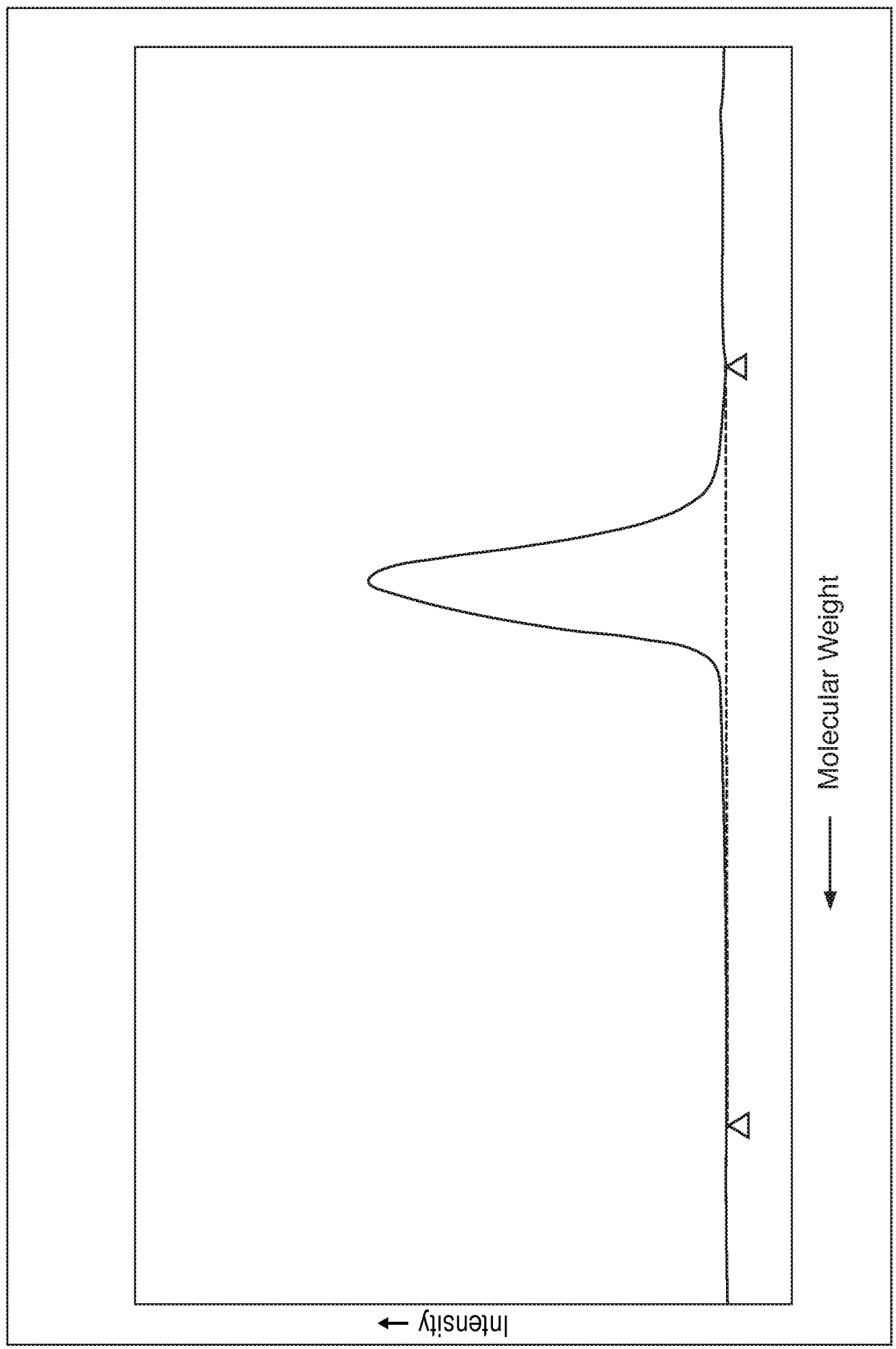
FIG. 1 is a GPC illustrating the molecular weight distribution of a product prepared by a prior art process with no pre-CAOS charge and a 5 weight percent non-CAOS cap.

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, as determined by GPC, unless indicated otherwise.

As used herein, hydroxyl number (OH number) was determined according to ASTM D4274-11, and was reported in mg [KOH]/g [polyol].

The viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As used herein, a polyoxyalkylene polyol with a narrow molecular weight distribution means one that is symmetrical or a molecular weight distribution in which the left side of the distribution mirrors the right side of the distribution. In other words, the molecular weight distribution is not skewed to one side or the other and has no second peaks or shoulders on one side or on both sides. Symmetrical means that there are no shoulders, peaks or tailing out on either side of the main peak. As would be recognized by one skilled in the art, a perfect monomodal material has a PDI (polydispersity index) of 1.00.

In accordance with the invention, the process comprises (a) forming a starter mixture comprising a H-functional starter substance ($S_i$), a H-functional starter substance ($S_x$) and a double metal cyanide catalyst, in which the starter mixture is optionally stripped under vacuum with or without nitrogen. This starter mixture is typically formed in a reactor. The portion of double metal cyanide catalyst and H-functional starter substances ($S_i$) and ($S_x$) is effective to initiate polyoxyalkylation of the starter mixture once an alkylene oxide is introduced into the reactor.

Suitable H-functional starter substances ($S_i$) to be used in accordance with the present invention include, for example, a polyoxyalkylene polyol which has a molecular weight that is approximately equal to the molecular weight of the product, i.e. the polyoxyalkylene polyol (P) that is being formed. In accordance with the invention, the theoretical functionality of the H-functional starter substance ($S_i$) is identical to the theoretical functionality of the polyoxyalkylene polyol (P) and the measured hydroxyl number of the H-functional starter substance ($S_i$) is within 10%, and preferably is within 5%, of the measured hydroxyl number of the polyoxyalkylene polyol (P). Thus, the H-functional starter substance ($S_i$) may have a functionality of 2 to 8, or preferably from 2 to 6, or more preferably from 2 to 3, and an OH number of from 5 to 35, or preferably from about 10 to 35, or more preferably from about 14 to about 28. In a preferred embodiment, the H-functional starter substance ($S_i$) is the same product (based on functionality, composition and hydroxyl number) as the final targeted product. This embodiment achieves the objective of eliminating the need to produce a low equivalent weight starter polyether polyol and have a separate storage tank to store this material by using the finished product from a previous production batch as the H-functional starter substance ($S_i$) of the starter mixture (hence a product-to-product approach).

When the H-functional starter substance ($S_i$) of the starter mixture comprises a polyoxyalkylene polyol, this polyoxyalkylene polyol can be a known residual amount of the product left in the reactor from a prior batch of the same product. This polyoxyalkylene polyol may be prepared from the same reactants as the final product prepared by the process of the invention, have the same functionality, molecular weight and hydroxyl number as the final product resulting from the process of the present invention, and thus be essentially the same as the final product prepared by the instantly claimed process. The skilled artisan would, however, recognize that it is not actually the same product as the final product since it was prepared in a different lot or reactor batch. As an example, after completion of the production of a batch of polyoxyalkylene polyol in a reactor by DMC catalysis, 90% of the product is removed from the reactor. The remaining 10% of the polyoxyalkylene polyol product can be left in the reactor and used as the H-functional starter substance ($S_i$) of the starter mixture of the present invention. It is also possible that the H-functional starter substance ($S_i$) of the starter mixture can comprise a final polyoxyalkylene polyol product that is stored in a finished goods storage vessel from a previous campaign which can be brought back into the reactor as the H-functional starter substance ($S_i$) of the starter mixture. The H-functional starter substance ($S_i$) of the starter mixture can also comprise a final polyoxyalkylene polyol product that has a similar molecular weight as the target product that was made using any alkoxylation catalyst known in the art, examples are basic catalysts (KOH or equivalent) and acid catalysts (Lewis acid or Bronsted acid induced catalysis) and which was refined to remove or neutralize the basic or acidic catalyst. The use of a basic catalyzed and subsequently neutralized polyoxyalkylene product is necessary, for example, when using this product as the H-functional starter substance ($S_i$) for the initial or first production of the polyoxyalkylene polyol (P) product. Removal or neutralization of the basic catalyst from the final polyoxyalkylene polyol product to be used as the H-functional starter substance ($S_i$) is required, as those skilled in art will recognize, because even trace levels of base or alkalinity deactivates and/or inhibits the DMC catalyst present in the starter mixture. In all cases, when a polyoxyalkylene polyol is used as the H-functional starter substance ($S_i$), the polyoxyalkylene polyol acts as a reaction medium to provide the minimum starter charge required by the reactor configuration (e.g. cover agitator blade, fill recirculation loop, cover internal heating/cooling coils, etc.). In one embodiment, the polyoxyalkylene polyol which is used as the H-functional starter substance ($S_i$) of the starter mixture has the same molecular weight and alkylene oxide composition as the targeted final polyoxyalkylene polyol product (P). In one embodiment, the polyoxyalkylene polyol used as the H-functional starter substance ($S_i$) of the starter mixture does not substantially participate in the reaction. The minimization of the molecular weight growth of the H-functional starter substance ($S_i$) of the starter mixture which comprises a polyoxyalkylene polyol provides the opportunity to produce a final product, i.e. the polyoxyalkylene polyol (P), with a narrow molecular weight distribution and low viscosity. In one embodiment, this H-functional starter substance ($S_i$) of the starter mixture which comprises a polyoxyalkylene polyol contains double metal cyanide catalyst residuals. In one embodiment, the double metal cyanide catalyst residuals were previously exposed to alkylene oxide. In one embodiment, the double metal cyanide catalyst residuals of the polyoxyalkylene polyol which is used as the H-functional starter substance ($S_i$) of the starter mixture were previously exposed to alkylene oxide under reaction conditions ("pre-activated" catalyst).

The H-functional starter substance ($S_i$) comprising a polyoxyalkylene polyol can contain antioxidants and/or acids known to those skilled in the art. For example, suitable antioxidants for polyoxyalkylene polyols include sterically hindered phenolic compounds or primary phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), etc. Examples of suitable acids include any inorganic protic mineral acid or organic acid which is known to be suitable as described in the art. Phosphoric acid is an example of a suitable acid.

The H-functional starter substance ($S_i$) which may comprise a polyoxyalkylene polyol can be vacuum stripped with or without steam and/or nitrogen to remove any residual compounds introduced from the reaction or the raw materials. The stripping of the H-functional starter substance ($S_i$) can occur either before or after the addition of the H-functional starter substance ($S_x$). Stripping of the H-functional starter substance ($S_i$) can also occur either before or after the addition of the double metal cyanide catalyst. Vacuum stripping of the H-functional starter substance ($S_i$) can occur with or without steam and/or nitrogen at ambient temperature, reaction temperature, or any value in between.

Suitable compounds to be used as the low equivalent weight H-functional starter substances ($S_x$) have an equivalent weight of less than or equal to 250 Da, or preferably less than or equal to 70 Da, or more preferably less than or equal to 50 Da. The suitable compounds to be used as low equivalent weight H-functional starter substances ($S_x$) may also have an equivalent weight of greater than or equal to 10 Da, preferably greater than or equal to 20 Da, and more preferably greater than or equal to 30 Da. Thus, H-functional starter substances ($S_x$) may have an equivalent weight between any combination of these upper and lower values, such as, for example, of greater than or equal to 10 Da to less than or equal to 250 Da, or preferably of greater than or equal to 20 Da to less than or equal to 70 Da, or more preferably of greater than or equal to 30 Da to less than or equal to 50 Da. Suitable compounds, for example, include compounds that have a functionality of from 2 to 8, or preferably from 2 to 3. Some examples of suitable compounds to be used as the H-functional starter substance ($S_x$) include diols and triols such as, for example, ethylene glycol, propylene glycol, butylene glycol, glycerin, water, trimethylolpropane (TMP), sorbitol, sucrose and other low equivalent weight polyoxyalkylene polyols (which have an equivalent weight within the above range). These compounds are low equivalent weight starters. In one embodiment, the low equivalent weight H-functional starter substance ($S_x$) of the starter mixture may be the same substance as the continuously fed H-functional starter substance ($S_c$).

The low equivalent weight H-functional starter substance ($S_x$) is added at a level from 0.1 to 2.0 weight percent (or from 0.25 to 1.75 weight percent, or from 0.5 to 1.5 weight percent) based on the weight of the polyoxyalkylene polyol H-functional starter substance ($S_i$) of the starter mixture of step ($\alpha$). The low equivalent weight H-functional starter substance ($S_x$) can be added to the reaction vessel before, after or simultaneously with the polyoxyalkylene polyol H-functional starter substance ($S_i$) of the starter mixture described above. The low equivalent weight, H-functional starter substance ($S_x$) can be added to the reaction vessel before, after or simultaneously with the DMC catalyst. The low equivalent weight H-functional starter substance ($S_x$) can be added before or after the polyoxyalkylene polyol H-functional starter substance ($S_i$) and the DMC catalyst of the starter mixture is stripped with or without nitrogen. The low equivalent weight H-functional starter substance ($S_x$) must be added to the polyoxyalkylene polyol H-functional starter substance ($S_i$) and DMC catalyst before alkylene oxide is added to the reaction vessel. The presence of a low equivalent weight H-functional starter substance ($S_x$) in the starter mixture formed in (a) is referred to as a "pre-CAOS" (Continuous Addition of Starter) charge.

Acid can be added to the low equivalent weight H-functional starter substance ($S_x$) before or after the low equivalent weight H-functional starter substance ($S_x$) is added to the reaction vessel. The acid may be any inorganic protic mineral acid or organic acid which is known to be suitable as described in the art. Typically, the amount of acid to be added to the low equivalent weight H-functional starter substance ($S_x$) ranges from 30 to 250 ppm, based on the weight of the low equivalent weight H-functional starter substance ($S_x$). Phosphoric acid is an example of a suitable acid.

Suitable double metal cyanide catalysts for the present invention include any DMC catalyst known in the art. The well-known DMC catalysts are typically the reaction product of a water-soluble metal salt (e.g. zinc chloride) and a water-soluble metal cyanide salt (e.g. potassium hexacyanocobaltate). The preparation of DMC catalysts is described in various references, including, for example, U.S. Pat. Nos. 5,158,922, 4,477,589, 3,427,334, 3,941,849, 5,470,813 and 5,482,908, the disclosures of which are herein incorporated by reference. Particular DMC catalysts that are preferred in some embodiments of the present invention are zinc hexacyanocobaltates. In one embodiment, the DMC catalysts are amorphous.

The DMC catalyst includes an organic complexing agent. As taught in the preceding references, the complexing agent is needed for an active catalyst. Preferred complexing agents include water-soluble heteroatom-containing organic compounds that can complex with the DMC compound. In one embodiment, the preferred complexing agents are water-soluble aliphatic alcohols. Tert-butyl alcohol is a preferred complexing agent for some embodiments. In addition to the organic complexing agent, the DMC catalyst may also include a polyether as is described in U.S. Pat. No. 5,482,908, the disclosure of which is herein incorporated by reference.

Preferred DMC catalysts for use in accordance with one or more embodiments of the present process are the highly active DMC catalysts such as are described in U.S. Pat. Nos. 5,482,908 and 5,470,813. High activity allows for the use of very low concentrations of the catalyst to be used. More specifically, the concentrations of catalyst required is typically low enough to overcome or eliminate any need to remove the catalyst from the finished polyoxyalkylene polyol products (P) formed in the process. In particular, the concentration of catalyst is typically in the range of from 10 ppm to 300 ppm, or from 20 ppm to 200 ppm, or from 30 ppm to 100 ppm.

The DMC catalyst can be added as a dry powder directly to the starter mixture, or dispersed in an H-functional starter substance ($S_i$ or $S_x$ above) and added to the starter mixture. The DMC catalyst added to the starter mixture is the same as the DMC catalyst residual contained in the polyoxyalkylene polyol used as the H-functional starter substance ($S_i$) of the starter mixture. The DMC catalyst added to the starter mixture can be un-activated or fresh catalyst, i.e. catalyst that has not previously been exposed to alkylene oxide, catalyst that has been exposed to alkylene oxide under non-reaction conditions (i.e. temperature <90° C.); or "pre-activated" catalyst, i.e. catalyst that was previously exposed to alkylene oxide under reaction conditions (i.e. temperature ≥90° C.). The DMC catalyst residuals in the polyoxyalkylene polyol H-functional starter substance ($S_i$) of the starter mixture are considered "pre-activated" catalyst as this catalyst was exposed to alkylene oxides under reaction conditions during the making of the polyoxyalkylene polyol H-functional starter substance ($S_i$) of the starter mixture. The "pre-activated" catalyst in the polyoxyalkylene polyol H-functional starter substance ($S_i$) of the starter mixture is advantageous to the present invention to allow a rapid activation of the starter mixture when alkylene oxide is added and counter the known inhibitory effect of the low equivalent weight H-functional starter substance ($S_x$) that is present in the starter mixture. The combination of "pre-activated" catalyst from the polyoxyalkylene polyol H-functional starter substance ($S_i$) of the starter mixture and fresh or "pre-activated" catalyst added to the starter mixture also insures a good reaction (i.e. no rapid pressure increase or temperature fluctuations) when the continuously added H-functional starter substance ($S_c$) is added. The DMC catalyst added to the starter mixture can be the same as or different from the residual catalyst or "pre-activated" catalyst in the polyoxyalkylene polyol H-functional starter substance ($S_i$) of the starter mixture.

The DMC catalyst (which may be fresh catalyst or pre-activated catalyst) is typically added to the starter mixture. It can, however, also be split between the starter mixture and the continuously added H-functional starter substance ($S_c$). Splitting the DMC catalyst and feeding the DMC catalyst continuously with the H-functional starter substance ($S_c$) provides a lower initial catalyst concentration in the starter mixture, and a more uniform catalyst concentration during the production of the polyoxyalkylene polyol product (P).

In the process of the present invention, the DMC catalyst present in the starter mixture is activated in the presence of alkylene oxide. Activation of the DMC catalyst present in the starter mixture occurs by optionally ($\beta$) adding an activation amount of (b) an alkylene oxide to the starter mixture formed in step ($\alpha$). The alkylene oxide for the activation of the starter mixture can be added all at once to the starter ($S_i$, $S_x$ and DMC catalyst) mixture of step ($\alpha$) wherein the pressure in the reactor system will increase rapidly or the alkylene oxide can be slowly added during the initial ramp-up of the alkylene oxide feed wherein the pressure in the reactor system will increase slowly. The activation of the DMC catalyst present in the starter mixture is detected when the pressure of the alkylene oxide decreases to half of the amount of the peak pressure detected in the case of the rapid addition of the alkylene oxide, or when the pressure begins to decrease and the reactor system begins to cool the reaction (indicating the presence of a reaction) in the case of slow addition of the alkylene oxide. The amount of alkylene oxide added for activation is from 1 to 12 weight percent, based on the amount of the H-functional starter substance ($S_i$) present in the starter mixture. As used herein, the amount of alkylene oxide necessary to activate the DMC catalyst present in the starter mixture of step ($\alpha$) may be referred to as the "initial" or "activation" alkylene oxide.

The low equivalent weight H-functional starter substance ($S_x$) is present to react with the activation amount of (b) an alkylene oxide which is added in step ($\beta$) to the starter mixture of step ($\alpha$) during the activation of the DMC catalyst or with (a) the alkylene oxide during the initial ramp up of the continuous addition of alkylene oxide in step ($\gamma$) before step ($\delta$) the continuous addition of the continuously added H-functional starter substance ($S_c$) is started. The reaction of the low equivalent weight H-functional starter substance ($S_x$) with the activation amount of (b) alkylene oxide which is added in step ($\beta$) prevents the polyoxyalkylene polyol used as the H-functional starter substance ($S_i$) of the starter mixture from reacting with this activation amount of alkylene oxide and increasing the polydispersity of the final polyoxyalkylene polyol product (P). The low equivalent weight H-functional starter substance ($S_x$) must be added to the starter mixture in an amount sufficient to react with the activation and/or initial alkylene oxide (i.e. before starting step ($\delta$) the continuous addition of the H-functional starter substance ($S_c$)) and limits the increase in the polydispersity and viscosity of the final polyoxyalkylene polyol (P) product due to the reaction of the activation and/or initial amount of alkylene oxide with the polyoxyalkylene polyol H-functional starter substance ($S_i$) of the starter mixture. However, addition of too much of the low equivalent weight H-functional starter substance ($S_x$) will result in no reaction or a sluggish reaction of the activation and/or initial amount of alkylene oxide, and may inhibit the DMC catalyst in a way that results in production of a low quality product (i.e. a product having a high polydispersity and a high viscosity). The skilled artisan knows and understands that the lowest equivalent weight substance preferably reacts with alkylene oxide in the presence of DMC catalyst, hence the low equivalent weight H-functional starter substance ($S_x$) will preferentially react with the activation and/or initial amount of alkylene oxide present. This is commonly known and referred to by one of ordinary skill in the art as "catch up kinetics". Catch up kinetics is described in "Chemistry and Technology of Polyols for Polyurethanes", $2^{nd}$ Edition, Volume 1, 2016, M. Ionescu, pages 189-190, the disclosure of which is herein incorporated by reference.

The process of the invention additionally comprises step ($\gamma$) continuously adding (a) an alkylene oxide to the mixture of step ($\beta$) when step ($\beta$) is present or to the mixture of step ($\alpha$) when step ($\beta$) is not present. This continuous addition comprises starting and increasing the addition of alkylene oxide in a steady manner until the final target feed rate of alkylene oxide is reached. The ramp-up of the alkylene oxide feed(s) typically takes from 5 to 35 minutes before reaching the final target feed rate(s).

Suitable alkylene oxides to be used as alkylene oxides (a) and/or (b) in accordance with the invention include, but are not limited to, compounds such as ethylene oxide, propylene oxide, 1,2- and 2,3-butylene oxide, isobutylene oxide, epichlorohydrin, cyclohexene oxide, and styrene oxide. In addition to the alkylene oxide block(s), carbon dioxide can be added in combination with the alkylene oxide(s) to form polyether carbonate polyols. The alkylene oxide(s) used as component (a) and/or (b) in the invention may be the same or different.

In accordance with the invention, the process additionally comprises ($\delta$) continuously adding a H-functional starter substance ($S_c$).

Suitable compounds to be used as the continuously added H-functional starter substance ($S_c$) include, for example, compounds which have a (nominal) hydroxyl functionality of at least about 2 up to about 8, or preferably from about 2 to about 3, and which have an equivalent weight of greater than or equal to 10 Da, or of at least 30 Da, and an equivalent weight of less than or equal to 70 Da, or preferably of less than or equal to about 50 Da. Thus, the H-functional starter substances ($S_c$) may have an equivalent weight ranging between any combination of these upper and lower values, such as, for example, of greater than or equal to 10 Da to less than or equal to 70 Da, or preferably from about 30 Da to about 50 Da. Suitable compounds to be used as the continuously added H-functional starter substance ($S_c$) herein, include compounds such as, for example, but are not limited to, ethylene glycol, propylene glycol, 1,3-propanediol, 1,4-butanediol, 1,2-butanediol, 1,3-butanediol, 2,3-butanediol, water, glycerin, sorbitol, sucrose, etc. Mixtures of monomeric initiators or their oxyalkylated oligomers may also be utilized. The continuously added H-functional starter substance ($S_c$) can be the same as or different from the low equivalent weight H-functional starter substance ($S_x$) of the starter mixture formed in step ($\alpha$).

In an embodiment of the invention, the continuously added H-functional starter substance ($S_c$) is selected from propylene glycol and/or glycerin. In one embodiment, the continuously added H-functional starter substance ($S_c$) is the same substance as the low equivalent weight H-functional starter substance ($S_x$) in the starter mixture.

The continuously added H-functional starter substances ($S_c$) can be acidified with a small amount of a suitable acid as described in, for example, U.S. Pat. Nos. 6,077,978 and 7,919,575. The acid may be any inorganic protic mineral acid or organic acid which is known to be suitable as described in the art. Typically, the amount of acid to be added to the continuously added H-functional starter substance ($S_c$) ranges from 30 to 250 ppm, based on the weight of the continuously added H-functional starter substance ($S_c$). In one embodiment, the continuously added H-functional starter substance ($S_c$) contains from 120 to 240 ppm of acid. Phosphoric acid is an example of a suitable acid.

In the process of the present invention, in step ($\delta$) the continuous addition of H-functional starter substance ($S_c$) is started and may be ramped simultaneously with the continuously added alkylene oxide in step ($\gamma$). The continuously added H-functional starter substance ($S_c$) is started before 4 weight percent of the total weight of alkylene oxides from step ($\gamma$) or from steps ($\beta$) and ($\gamma$) is fed, including the weight of alkylene oxides fed to activate the DMC catalyst present in the starter mixture.

In accordance with the invention, the polyoxyalkylation of the H-functional starter substances ($S_i$, $S_x$ and $S_c$) with the alkylene oxides from step ($\gamma$) and optionally from step ($\beta$) is completed to form a polyoxyalkylene polyol (P) having a functionality of from 2 to 8 and an OH number of from about 5 to 35. The polyoxyalkylene polyols (P) formed by the process of the present invention typically have functionalities of from 2 to 8, or preferably from 2 to 6, or more preferably from 2 to 3, and OH numbers of from about 5 to 35, or preferably from about 10 to 35, or more preferably from about 14 to about 28.

In the process of the present invention, (i) the steps (γ) and (δ) either start simultaneously or step (γ) starts before step (δ); (ii) the theoretical functionality of the H-functional starter substance ($S_i$) is identical to the theoretical functionality of the polyoxyalkylene polyol (P) and the measured hydroxyl number of the H-functional starter substance ($S_i$) is within 10%, or preferably within 5%, of the measured hydroxyl number of the polyoxyalkylene polyol (P); (iii) the H-functional starter substance ($S_x$) has an equivalent weight of greater than or equal to 10 Da and less than or equal to 250 Da, or preferably of greater than or equal to 20 Da and less than or equal to 70 Da, or more preferably of greater than or equal to 30 Da to less than or equal to 50 Da; (iv) the H-functional starter substance ($S_c$) has an equivalent weight of greater than or equal to 10 Da and less than or equal to 70 Da; (v) in step (δ) the continuous addition of the H-functional starter substance ($S_c$) is stopped when from 30 to 99 weight percent of the total weight of alkylene oxide added in step (γ) has been added; and (vi) the hydroxyl numbers are determined according to ASTM D4274-11.

In the process of the invention, (v) in step (δ), the addition of the H-functional starter substance ($S_c$) is stopped when from 30 weight percent to 99 weight percent of the total weight of alkylene oxide has been added in step (γ) or in steps (β) and (γ). Preferably, the addition of the H-functional starter substance ($S_c$) is stopped when from 35 weight percent to 95 weight percent, or more preferably when from 40 to 80 weight percent, of the total weight of alkylene oxide has been added in step (γ) or in steps (β) and (γ). Stopping the addition of the continuously added H-functional starter substance ($S_c$) in this manner results in the polyoxyalkylation being completed with only the addition of alkylene oxide. This is referred to as a "non-CAOS" cap.

In an embodiment of the present invention, the continuously added H-functional starter substance ($S_c$) in step (δ) may be fed at a constant ratio with the alkylene oxide. In this embodiment, the ratio of adding the continuously added H-functional starter substance ($S_c$) to the alkylene oxide is set such that the addition of the continuously added H-functional starter substance ($S_c$) finishes prior to the alkylene oxide reaching its targeted weight. Stopping the continuously added H-functional starter substance ($S_c$) and continuing the alkylene oxide feed allows the continuously added H-functional starter substance ($S_c$) to fully react with the remaining alkylene oxide to provide a narrow molecular weight distribution in the polyoxyalkylene polyol (P) product. This eliminates any skewing of the molecular weight distribution to the lower molecular weight side.

Feeding alkylene oxide at the end of the reaction with no continuously added H-functional starter substance ($S_c$) is referred to as a "non-CAOS" cap. Feeding the continuously added H-functional starter substance ($S_c$) until 100% of the target alkylene oxide is added means that there is a 0% "non-CAOS" cap of the polyoxyalkylene polyol (P) product. The term "non-CAOS" cap is defined as the amount of alkylene oxide fed at the end of the batch with no continuously added H-functional starter substance ($S_c$), divided by the total batch weight.

In accordance with the invention, in step (δ) when the continuously added H-functional starter substance ($S_c$) is added to the reaction mixture, alkylene oxide must be simultaneously added with the continuously added H-functional starter substance ($S_c$). During the addition of the continuously added H-functional starter substance ($S_c$), if, for any reason, the feed of the continuously added H-functional starter substance ($S_c$) or the alkylene oxide is interrupted and stops, the other feed must stop as well. Upon restarting after a feed interruption, these feeds must start and be ramped up simultaneously. Feeding the alkylene oxide with no continuously added H-functional starter substance ($S_c$), prior to the targeted non-CAOS cap, can significantly alter the molecular weight distribution and increase the product viscosity, even if the correct amount of continuously added H-functional starter substance ($S_c$) is added later in the batch (so the correct hydroxyl number or equivalent weight is attained). Feeding the continuously added H-functional starter substance ($S_c$) with no alkylene oxide can cause DMC catalyst reactivity issues when the alkylene oxide feed is restarted, including catalyst deactivation and/or temperature excursions leading to undesirable changes to the molecular weight distribution and viscosity.

In accordance with the present invention, the process is typically carried out in a stainless steel reaction vessel (e.g. 35 Liter or larger) equipped with an electrically heated jacket and an internal coil that can be used for heating or cooling the reaction mixture. Steam, water or a combination of the two can be passed through cooling coil to control the reaction temperature. Tempered water or a hot oil system can also be used to control the temperature. The reactor system includes a mechanical agitator that can be equipped with a single agitating device such as a gate-type mixer or an anchor type mixer or other such devices known to those skilled in the art. The agitator could also be equipped with one or multiple mixers such as pitched blade impeller, Rushton-type impeller, flat blade, curved blade, tilted blade or other such devices known to those skilled in the art. The blades can be used individually or in combination. The agitator speed can be constant or varied during the batch. The reactor internals may include baffles. The reactor can also be equipped with a recirculation pump loop that withdraws the reaction mixture from the bottom portion of the reactor and pumps the reaction mixture back into the reactor through a dip tube or spray nozzle in the upper part of the reactor or through a dip tube or sparge ring at the bottom part of the reactor. The recirculation loop can include a heat exchanger for temperature control or can include a static mixing device. The reactor and associated metering and monitoring equipment are connected to a digital process control system.

The reactor system includes an alkylene oxide dosing system for one or more alkylene oxide feeds (e.g. propylene and/or ethylene oxide). When more than one alkylene oxide is used, the alkylene oxides can be introduced to the reactor together or separately. They can be mixed and fed in together, or they can be stored separately and mixed using a static mixing device before being introduced to the reactor. The alkylene oxides can be introduced into the headspace of the reactor through a dip tube or spray nozzle or into the liquid phase in the reactor through a dip tube or sparge ring. The mixing impellers can be optimized to match the location of alkylene oxide addition to provide a high shear/mixing zone near the alkylene oxide injection location. The alkylene oxides can also be introduced to the recirculation line directly or via a static mixing device. The alkylene oxide feeds can be dosed over a range of 0.25 hours to 20 hours depending on the reactor configuration (mixing) and heat removal capabilities.

The reactor system includes a dosing system for the continuously added H-functional starter substance ($S_c$). When more than one continuously added H-functional starter substances ($S_c$) are used, these can be introduced to the reactor together or separately. They can be mixed and fed in together, or they can be stored separately and mixed using a static mixing device before being introduced to the reactor. The continuously added H-functional starter substances ($S_c$) can be introduced into the headspace of the reactor through a dip tube or spray nozzle or into the liquid phase in the reactor through a dip tube or sparge ring. The mixing impellers can be optimized to match the location of continuously added H-functional starter substances ($S_c$) addition point to provide a high shear/mixing zone near the continuously added H-functional starter substance ($S_c$) injection location. The continuously added H-functional starter substance ($S_c$) can also be introduced to the recirculation line directly or via a static mixing device. The continuously added H-functional starter substance ($S_c$) can also be premixed with the alkylene oxide and introduced to the reactor directly via a dip tube or sparge ring or via a static mixing device.

The finished polyoxyalkylene polyol product (P) of the present invention containing residual DMC catalysts can be vacuum stripped with or without steam and/or nitrogen to remove any residual compounds introduced from the reaction or the raw materials. The finished polyoxyalkylene polyol product (P) is also typically inhibited with antioxidants known to the skilled artisan. Examples of suitable antioxidants for polyether polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201) or other equivalent antioxidants or inhibitors. The finished polyoxyalkylene polyol product (P) may also be acidified with any inorganic protic mineral acid or organic acid which is known to be suitable as described in the art. The finished polyoxyalkylene polyol product (P) is preferably inhibited with an antioxidant prior to stripping, with or without steam and/or nitrogen. Additional inhibitor can be added after the stripping, with or without steam and/or nitrogen, and any acid addition, if required, is preferably added after the stripping, with or without steam and/or nitrogen. The final inhibitor and/or acid can be added directly to the stripping vessel, or to the storage vessel, or can be continuously added to the product in the transfer line between the stripping vessel and the storage vessel. Alternatively, the polyoxyalkylene polyol product (P) can be stored with only antioxidant and any required acid can be added to the storage vessel prior to shipment or to the shipping container, either directly to the container or added continuously to the transfer line between the storage vessel and the shipping container or prior to the final product use.

In a first embodiment, the invention is directed to a process for the preparation of polyoxyalkylene polyols (P) having a functionality of 2 to 8 and an hydroxyl number of from 5 mg KOH/g polyol to 35 mg KOH/g polyol by reaction of H-functional starter substances ($S_i$), ($S_c$) and ($S_x$) with one or more alkylene oxide(s) in the presence of a double metal cyanide catalyst (DMC), in which the process comprises the steps (a) forming a starter mixture comprising the H-functional starter substance ($S_i$), the H-functional starter substance ($S_x$) and the double metal cyanide catalyst, and optionally, stripping the starter mixture under vacuum with or without nitrogen; ($\gamma$) continuously adding (a) an alkylene oxide to the starter mixture of step ($\alpha$); and ($\delta$) continuously adding the H-functional starter substance ($S_c$); wherein (i) the steps ($\gamma$) and ($\delta$) either start simultaneously or step ($\gamma$) starts before step ($\delta$); (ii) the theoretical functionality of the H-functional starter substance ($S_i$) is identical to the theoretical functionality of the polyoxyalkylene polyol (P) and the measured hydroxyl number of the H-functional starter substance ($S_i$) is within 10% of the measured hydroxyl number of the polyoxyalkylene polyol (P); (iii) the H-functional starter substance ($S_x$) has an equivalent weight of greater than or equal to 10 Da and less than or equal to 250 Da; (iv) the H-functional starter substance ($S_c$) has an equivalent weight of greater than or equal to 10 Da and less than or equal to 70 Da; (v) in step ($\delta$), the continuous addition of the H-functional starter substance ($S_c$) is stopped when from 30 weight percent to 99 weight percent of the total weight of alkylene oxide added in step ($\gamma$) has been added; and (vi) the hydroxyl numbers are determined according to ASTM D4274-11.

In a second embodiment, the invention is directed to the process according to the first embodiment additionally comprising ($\beta$) adding an activation amount of (b) an alkylene oxide to the starter mixture of step ($\alpha$), wherein in step ($\gamma$) the continuous addition of (a) alkylene oxide is to the mixture formed in ($\beta$); and (v) in step ($\delta$) the continuous addition of the H-functional starter substance ($S_c$) is stopped when from 30 weight percent to 99 weight percent of the total weight of alkylene oxide added in steps ($\beta$) and ($\gamma$) has been added.

In a third embodiment, the invention is directed to the process according to the first or second embodiments wherein (ii) the theoretical functionality of the H-functional starter substance ($S_i$) is identical to the theoretical functionality of the polyoxyalkylene polyol (P) and the measured hydroxyl number of the H-functional starter substance ($S_i$) is within 5% of the measured hydroxyl number of the polyoxyalkylene polyol (P).

In a fourth embodiment, the invention is directed to the process according to the first or third embodiments wherein (v) in step ($\delta$) the continuous addition of the H-functional starter substance ($S_c$) is stopped when from 35 to 95 weight percent, preferably when from 40 to 80 weight percent, of the total weight of alkylene oxide added in step ($\gamma$) is added.

In a fifth embodiment, the invention is directed to the process according to the second or third embodiments wherein (v) in step ($\delta$) the continuous addition of the H-functional starter substance ($S_c$) is stopped when from 35 to 95 weight percent, preferably when from 40 to 80 weight percent, of the total weight of alkylene oxide added in steps ($\beta$) and ($\gamma$) is added.

In a sixth embodiment, the invention is directed to the process according to one of the first to the fifth embodiments wherein the H-functional starter substance ($S_i$) has a functionality of about 2 to about 8 and an OH number of 5 to 35, preferably a functionality of from 2 to 6 and an OH number of 10 to 35, more preferably a functionality of 2 to 3 and an OH number of 14 to 28.

In a seventh embodiment, the invention is directed to the process according to one of the first to the sixth embodiments in which the H-functional starter substance ($S_i$) comprises a polyoxyalkylene polyol containing double metal cyanide catalyst residuals.

In an eighth embodiment, the invention is directed to the process according to one of the first to the seventh embodiments in which the H-functional starter substance ($S_i$) comprises a polyoxyalkylene polyol containing double metal cyanide catalyst residuals wherein the double metal cyanide catalyst residuals were previously exposed to alkylene oxide.

In a ninth embodiment, the invention is directed to the process according to one of the first to the eighth embodiments in which the H-functional starter substance ($S_i$) comprises a polyoxyalkylene polyol containing double metal cyanide catalyst residuals wherein the double metal cyanide catalyst residuals comprise a pre-activated catalyst which was previously exposed to alkylene oxide under reaction conditions.

In a tenth embodiment, the invention is directed to the process according to one of the first to the ninth embodiments in which the H-functional starter substance ($S_i$) comprises a polyoxyalkylene polyol which comprises an antioxidant and/or an acid.

In an eleventh embodiment, the invention is directed to the process according to one of the first to the tenth embodiments wherein the H-functional starter substance ($S_x$) has an equivalent weight of about 20 Da to about 70 Da, preferably of 30 Da to 50 Da.

In a twelfth embodiment, the invention is directed to the process according to one of the first to the eleventh embodiments wherein said H-functional starter substance ($S_x$) comprises ethylene glycol, propylene glycol, butylene glycol, glycerin, water, trimethylolpropane, sorbitol, sucrose, or combinations thereof.

In a thirteenth embodiment, the invention is directed to the process according to one of the first to the twelfth embodiments in which the H-functional starter substance ($S_c$) has an equivalent weight of about 30 Da to about 50 Da.

In a fourteenth embodiment, the invention is directed to the process according to one of the first to the thirteenth embodiments in which (a) the alkylene oxide which is continuously added in ($\gamma$) comprises propylene oxide, ethylene oxide, or combinations thereof.

In a fifteenth embodiment, the invention is directed to the process according to one of the second to the fourteenth embodiments in which (b) the alkylene oxide which is added in ($\beta$) comprises propylene oxide, ethylene oxide, or combinations thereof.

In a sixteenth embodiment, the invention is directed to the process according to one of the first to the fifteenth embodiments in which the H-functional starter substance ($S_x$) is present in an amount of from 0.1 to 2.0 weight percent, preferably from 0.25 to 1.75 weight percent, more preferably from 0.5 to 1.5 weight percent, based on the weight of said H-functional starter substance ($S_i$) present in said starter mixture of step ($\alpha$).

In a seventeenth embodiment, the invention is directed to the process according to one of the first to the sixteenth embodiments wherein said H-functional starter substance ($S_x$) and said H-functional starter substance ($S_c$) are the same substance.

In an eighteenth embodiment, the invention is directed to the process according to one of the first to the seventeenth embodiments wherein the H-functional starter substance ($S_c$) comprises ethylene glycol, propylene glycol, butylene glycol, glycerin, water, trimethylolpropane, sorbitol, sucrose, or combinations thereof.

In a nineteenth embodiment, the invention is directed to the process according to one of the first to the eighteenth seventeenth embodiments wherein the H-functional starter substance ($S_c$) additionally comprises at least one acid.

In a twentieth embodiment, the invention is directed to the process according to one of the first to the nineteenth embodiments wherein the resultant polyoxyalkylene polyol (P) has a functionality of from 2 to 6 and a hydroxyl number of about 10 to 35, preferably a functionality of from 2 to 3 and an OH number of from 14 to In a twenty-first embodiment, the invention is directed to the process according to one of the first to the twentieth embodiments, wherein the amount of alkylene oxide added in step ($\gamma$) to activate the catalyst is from 1 to 12 weight percent of the H-functional starter substance ($S_i$) present in the starter mixture of step ($\alpha$).

In a twenty-second embodiment, the invention is directed to the process according to one of the second to the twentieth embodiments wherein the amount of alkylene oxide added in step ($\beta$) to activate the catalyst is from 1 to 12 weight percent of the H-functional starter substance ($S_i$) present in the starter mixture of step ($\alpha$).

In a twenty-third embodiment, the invention is directed to the process according to one of the first to the twenty-second embodiments wherein step ($\delta$) continuously adding said H-functional starter substance ($S_c$) starts before 4 weight percent of the total weight of alkylene oxide added from step ($\gamma$) is fed.

In a twenty-fourth embodiment, the invention is directed to the process according to one of the second to the twenty-third embodiments, wherein step ($\delta$) continuously adding said H-functional starter substance ($S_c$) starts before 4 weight percent of the total weight of alkylene oxide added from steps ($\beta$) and ($\gamma$) is fed.

In a twenty-fifth embodiment, the invention is directed to the process according to one of the first through the twenty-fourth embodiments wherein the resultant polyoxyalkylene polyol (P) additionally comprises an antioxidant and/or an acid.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

Examples

In the examples, the OH (hydroxyl numbers) were determined in accordance with ASTM D-4274-11, as described above, and are reported in mg [KOH]/g polyol.

Viscosity was determined in accordance with ASTM-D4878-15 as described above.

Gel Permeation Chromatography (GPC) was used to determine the molecular weights (weight average and number average) in accordance with DIN 55672-1 as described hereinabove. All molecular weights are number average unless specified otherwise.

The examples herein were carried out in a 35 Liter stainless steel reaction vessel equipped with an electrically heated jacket and an internal coil that can be used for cooling the reaction mixture using water. The reactor was equipped with baffles and an agitator that contains a Ruston type agitator at the bottom and pitched blade in the upper portion. The alkylene oxide and continuously added H-functional starter substance ($S_c$) feeds were introduced into the liquid phase using dip pipes.

The following compounds or materials were used in the examples.

Polyol A: a polyether polyol having a functionality of 2 and an equivalent weight of 213, prepared by alkoxylation of propylene glycol with propylene oxide Catalyst A: A double metal cyanide catalyst prepared according to the procedure in U.S. Pat. No. 5,482,908.

Irganox E-201: a primary (phenolic) antioxidant, which contains Vitamin E, and is commercially available from BASF Comparative Example 1 (No Addition of $S_x$)

To the 35 L reactor described above 2500 grams of a 8000 MW diol ($S_i$) made via semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. Propylene oxide (100 g) was charged to activate the catalyst. The pressure increased to 10 psia and then steadily decreased indicating the catalyst was active. When the pressure reached 2 psia, the PO feed was restarted and ramped to 74.9 g/min over 20 minutes. Simultaneously, propylene glycol, as the continuously added starter ($S_c$), was started and ramped to a feed rate of 0.77 g/min. The PG, as $S_c$, started after 100 g of PO was fed or 0.6 wt % of the total PO to be fed (100 g/17334 g). The PG was fed at a ratio of 1.02 wt. % based on the PO feed rate (0.77 g/min PG/74.9 g/min PO). The PG and PO feeds continued until the PG feed met the target weight of 166 grams. At the targeted PG/PO ratio of 1.02 wt. % the target was reached after 16334 grams of PO was fed or 94% of the total PO. The remaining 1000 grams of PO continued at the feed rate of 74.9 g/min until the final PO target of 17334 grams was reached. The feeding of 1000 grams of PO without the PG feed corresponds to a "non-CAOS" cap of 5 wt. % based on the total batch weight (1000 g/20000 g batch). The final product (P) was inhibited with 160 ppm Irganox E-201. The final product (P) had a hydroxyl number of 14 mg KOH/g and a viscosity of 3726 cst (adjusted viscosity of 3726 cst, adjusting to a hydroxyl number of 14.0 mg KOH/g polyol, adjusting the viscosity to a given hydroxyl number is important for comparison of high equivalent weight products as the viscosity can vary significantly with equivalent weight) and a polydispersity index (Mw/Mn) of 1.137. This comparative example was made with no "pre-CAOS" charge (no $S_x$) to the starter mixture and with a 5 weight percent "non-CAOS" cap. FIG. 1 illustrates the molecular weight distribution made using this Product-to-Product process has a shoulder or non-uniformity at the higher molecular weight side resulting from the polyoxyalkylene polyol (P) which was used as the H-functional starter substance ($S_i$) of the starter mixture reacting with the activation alkylene oxide as no PG or low equivalent weight H-functional starter substance ($S_x$) was present in the starter mixture.

Example 2

Figure 2:
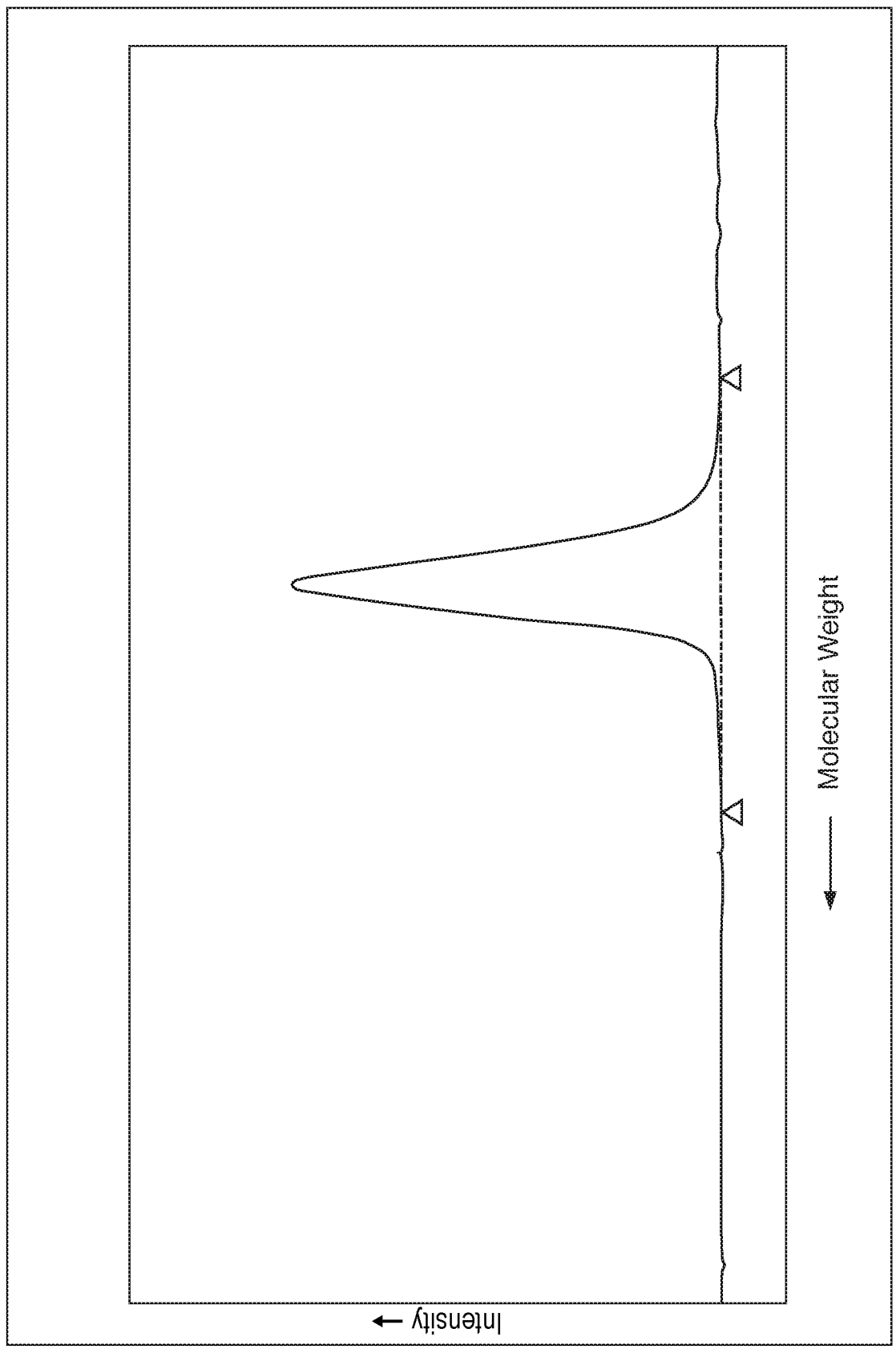
FIG. 2 is a GPC illustrating the molecular weight distribution of a product prepared in accordance with the present invention with a pre-CAOS charge and a 5 weight percent non-CAOS cap.

To the 35 L reactor described above 2500 grams of a 8000 MW diol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol ($S_x$) (0.5 wt % PG based on the polyoxyalkylene polyol substance ($S_i$) of the starter mixture weight) were charged to the polyoxyalkylene polyol substance ($S_i$) starter and catalyst mixture. The 12.5 grams of PG represents a 0.5 wt % "pre-CAOS" charge. Propylene oxide (100 g) was charged to activate the catalyst. The pressure increased to 15 psia and then steadily decreased indicating the catalyst was active. When the pressure reached 2 psia, the PO feed was restarted and ramped to 74.9 g/min over 20 minutes. Simultaneously, propylene glycol, as the continuously added starter ($S_c$), was started and ramped to a feed rate of 0.71 g/min. The PG, as $S_c$, started after 100 g of PO was fed or 0.6 wt % of the total PO to be fed (100 g/17334 g). The PG was fed at a ratio of 0.95 wt. % based on the PO feed rate (0.71 g/min PG/74.9 g/min PO). The PG and PO feeds continued until the PG feed met the target weight of 154 grams. At the targeted PG/PO ratio of 0.95% the target was reached after 16334 grams of PO was fed or 94% of the total PO. The remaining 1000 grams of PO continued at the feed rate of 74.9 g/min until the final PO target of 17334 grams was reached. The feeding of 1000 grams of PO without the PG feed corresponds to a "non-CAOS" cap of 5 weight percent based on the total batch weight (1000 g/20000 g batch). The final product (P) was inhibited with 160 ppm Irganox E-201. The final product (P) had a hydroxyl number of 13.9 mg KOH/g and a viscosity of 3412 cSt (adjusted viscosity of 3346 cSt, adjusting to a hydroxyl number of 14.0 mg KOH/g polyol) and a polydispersity index (Mw/Mn) of 1.103. The product (P) of this example was made with a "pre-CAOS" or H-functional starter substance charge ($S_x$) to the polyoxyalkylene polyol H-functional starter substance ($S_i$) of the starter mixture and with a 5 weight percent "non-CAOS" cap. FIG. 2 illustrates that in this example the high molecular weight shoulder was eliminated by adding the PG or "pre-CAOS" H-functional starter substance ($S_x$) to the polyoxyalkylene polyol H-functional starter substance ($S_i$) of the starter mixture prior to activation of the DMC catalyst with PO. The viscosity (and adjusted viscosity) of Example 2 was lower than the viscosity (and adjusted viscosity) of Comparative Example 1 due to the narrow molecular weight distribution of the product in Example 2.

Example 3

To the 35 L reactor described above, 2500 grams of a 8000 MW diol ($S_i$) made via a semi-batch process using Catalyst A and 0.675 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 25 grams of propylene glycol ($S_x$) (1.0 wt. % PG based on the weight of the polyoxyalkylene polyol substance ($S_i$) of the starter mixture) were charged to the polyoxyalkylene polyol substance ($S_i$) of the starter and catalyst mixture. The 25 grams of PG represents a 1.0 wt. % "pre-CAOS" charge. Propylene oxide (100 g) was charged to activate the catalyst. The pressure increased to 15 psia and then steadily decreased, indicating the catalyst was active. When the pressure reached 7 psia, the PO feed was restarted and ramped to 85.7 g/min over 20 minutes. Simultaneously, propylene glycol, as the continuously added starter ($S_c$), was started and ramped to a feed rate of 0.73 g/min. The PG, as $S_c$, started after 100 g of PO was fed or 0.5 wt % of the total PO to be fed (100 g/19810 g). The PG was fed at a ratio of 0.85 wt. % based on the PO feed rate (0.73 g/min PG/85.7 g/min PO). The PG and PO feeds continued until the PG feed met the target weight of 165 grams. At the targeted PG/PO ratio of 0.85% the target was reached after 18685 grams of PO was fed or 94% of the total PO. The remaining 1125 grams of PO continued at the feed rate of 85.7 g/min until the final PO target of 19810 grams was reached. The feeding of 1125 grams of PO without the PG feed corresponds to a "non-CAOS" cap of 5 wt. % based on the total batch weight (1125 g/22500 g batch). The final product (P) was inhibited with 160 ppm Irganox E-201. The final product (P) had a hydroxyl number of 13.6 mg KOH/g polyol, a viscosity of 3422 cSt (adjusted viscosity of 3158 cSt, adjusting to a hydroxyl number of 14.0 mg KOH/g polyol) and a polydispersity index (Mw/Mn) of 1.083. The product (P) of this example was made with a 1.0 weight percent "pre-CAOS" charge ($S_x$) to the polyoxyalkylene polyol substance ($S_i$) of the starter mixture and with a 5 weight percent "non-CAOS" cap. A low viscosity was maintained.

Example 4

To the 35 L reactor described above, 2500 grams of a 8000 MW diol ($S_i$) made via a semi-batch process using Catalyst A and 0.675 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 37.5 grams of propylene glycol ($S_x$) (1.5 wt. % PG based on the weight of the polyoxyalkylene polyol substance ($S_i$) of the starter mixture) were charged to the polyoxyalkylene polyol ($S_i$) substance of the starter and catalyst mixture. The 37.5 grams of PG represents a 1.5 wt. % "pre-CAOS" charge. Propylene oxide (100 g) was charged to activate the catalyst. The pressure increased to 15 psia and then steadily decreased, indicating the catalyst was active. When the pressure reached 5 psia, the PO feed was restarted and ramped to 85.7 g/min over 20 minutes. Simultaneously, propylene glycol, as the continuously added starter ($S_c$), was started and ramped to a feed rate of 0.67 g/min. The PG, as $S_c$, started after 100 g of PO was fed or 0.5 wt % of the total PO to be fed (100 g/19810 g). The PG was fed at a ratio of 0.78 wt. % based on the PO feed rate (0.67 g/min PG/85.7 g/min PO). The PG and PO feeds continued until the PG feed met the target weight of 152 grams. At the targeted PG/PO ratio of 0.78% the target was reached after 18685 grams of PO was fed or 94% of the total PO. The remaining 1125 grams of PO continued at the feed rate of 85.7 g/min until the final PO target of 19810 grams was reached. The feeding of 1125 grams of PO without the PG feed corresponds to a "non-CAOS" cap of 5 wt. % based on the total batch weight (1125 g/22500 g batch). The final product (P) was inhibited with 160 ppm Irganox E-201. The final product (P) had a hydroxyl number of 13.5 mg KOH/g polyol, a viscosity of 3729 cSt (adjusted viscosity of 3400 cSt, adjusting to a hydroxyl number of 14.0 mg KOH/g polyol) and a polydispersity index (Mw/Mn) of 1.129. The product (P) of this example was prepared with a 1.5 weight percent "pre-CAOS" charge ($S_x$) to the polyoxyalkylene polyol substance ($S_i$) of the starter mixture and with a 5 weight percent "non-CAOS" cap.

Example 5

To the 35 L reactor described above, 2505 grams of a 8000 MW diol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol ($S_x$) (0.5 wt. % PG based on the weight of the polyoxyalkylene polyol substance ($S_i$) of the starter mixture) were charged to the polyoxyalkylene polyol substance ($S_i$) of the starter and catalyst mixture. The 12.5 grams of PG represents a 0.5 wt. % "pre-CAOS" charge. Propylene oxide (100 g) was charged to activate the catalyst. The pressure increased to 15 psia and then steadily decreased, indicating the catalyst was active. When the pressure reached 3 psia, the PO feed was restarted and ramped to 85.9 g/min over 20 minutes. Simultaneously, propylene glycol, as the continuously added starter ($S_c$), was started and ramped to a feed rate of 0.95 g/min. The PG, as $S_c$, started after 100 g of PO was fed or 0.5 wt % of the total PO to be fed (100 g/19850 g). The PG was fed at a ratio of 1.1 wt. % based on the PO feed rate (0.95 g/min PG/85.9 g/min PO). The PG and PO feeds continued until the PG feed met the target weight of 178 grams. At the targeted PG/PO ratio of 1.1% the target was reached after 15341 grams of PO was fed or 77% of the total PO. The remaining 4509 grams of PO continued at the feed rate of 85.9 g/min until the final PO target of 19850 grams was reached. The feeding of 4509 grams of PO without the PG feed corresponds to a "non-CAOS" cap of 20 wt. % based on the total batch weight (4509 g/22545 g batch). The final product (P) was inhibited with 160 ppm Irganox E-201. The final product (P) had a hydroxyl number of 14.4 mg KOH/g polyol, a viscosity of 3032 cSt (adjusted viscosity of 3296 cSt, adjusting to a hydroxyl number of 14.0 mg KOH/g polyol) and a polydispersity index (Mw/Mn) of 1.069. The product (P) of this example was prepared with a "pre-CAOS" charge ($S_x$) to the polyoxyalkylene polyol substance ($S_i$) of the starter mixture and was made with a 20 weight percent "non-CAOS" cap.

Example 6

To the 35 L reactor described above, 2500 grams of a 8000 MW diol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 25 grams of Polyol A ($S_x$) (1.0 wt. % Polyol A based on the weight of the polyoxyalkylene polyol substance ($S_i$) of the starter mixture) were charged to the polyoxyalkylene polyol substance ($S_i$) of the starter and catalyst mixture. The 25 grams of Polyol A represents a 1.0 wt. % "pre-CAOS" charge. Propylene oxide (100 g) was charged to activate the catalyst. The pressure increased to 15 psia and then steadily decreased, indicating the catalyst was active. When the pressure reached 2 psia, the PO feed was restarted and ramped to 74.9 g/min over 20 minutes. Simultaneously, propylene glycol, as the continuously added starter ($S_c$), was started and ramped to a feed rate of 0.71 g/min. The PG, as $S_c$, started after 100 g of PO was fed or 0.6 wt % of the total PO to be fed (100 g/17338 g). The PG was fed at a ratio of 0.95 wt. % based on the PO feed rate (0.71 g/min PG/74.9 g/min PO). The PG and PO feeds continued until the PG feed met the target weight of 162 grams. At the targeted PG/PO ratio of 0.95% the target was reached after 16338 grams of PO was fed or 94% of the total PO. The remaining 1000 grams of PO continued at the feed rate of 74.9 g/min until the final PO target of 17338 grams was reached. The feeding of 1000 grams of PO without the PG feed corresponds to a "non-CAOS" cap of 5 wt. % based on the total batch weight (1000 g/20000 g batch). The final product (P) was inhibited with 160 ppm Irganox E-201. The final product (P) had a hydroxyl number of 13.4 mg KOH/g polyol, a viscosity of 3577 cSt (adjusted viscosity of 3182 cSt, adjusting to a hydroxyl number of 14.0 mg KOH/g polyol) and a polydispersity index (Mw/Mn) of 1.091. The product (P) of this example was made with a "pre-CAOS" charge of a low equivalent weight PG based polyether ($S_x$) and a 5 weight percent "non-CAOS" cap.

A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped,

TABLE 1

|  | Comp. Ex. 1 | Ex. 2 | Ex. 3 | Ex. 4 | Ex. 5 | Ex. 6 |
|---|---|---|---|---|---|---|
| Pre-CAOS, wt. % Addition of (Sx) in step α | 0 | 0.5 | 1.0 | 1.5 | 0.5 | 1.0 |
| Non-CAOS Cap, wt. % | 5 | 5 | 5 | 5 | 20 | 5 |
| Wt. % Oxide of Total Feed at Non CAOS Cap, wt. % | 94 | 94 | 94 | 77 | 94 | 94 |
| $S_c$ wt/Oxide wt, % | 1.02 | 0.95 | 0.85 | 0.78 | 1.1 | 0.95 |
| Hydroxyl Number[1] (mg KOH/g polyol) | 14 | 13.9 | 13.6 | 13.5 | 14.4 | 13.4 |
| Viscosity[2] (cSt @ 25° C.) | 3726 | 3412 | 3422 | 3729 | 3032 | 3577 |
| OH# Adjusted Viscosity (cSt @ 25° C.)[3] | 3726 | 3346 | 3158 | 3400 | 3296 | 3182 |
| Polydispersity (Mw/Mn)[4] | 1.137 | 1.103 | 1.083 | 1.129 | 1.069 | 1.091 |

[1]measured in accordance with ASTM-D4274-11
[2]measured in accordance with ASTM D-4878-15
[3]adjusted to target value (14.0 mg KOH/g) by using measured OH# and measured viscosity and linearly increasing viscosity when the measured OH# is greater than target (MW or EQ is less than target so MW or EQ must increase to reach target therefore viscosity increases) and linearly decreasing viscosity when the measured OH# is less than target (MW or EQ is greater than target so MW or EQ must decrease to reach target therefore viscosity decreases)
[4]measured in accordance with DIN 5567201

Comparative Example 7 (No Addition of $S_x$)

Figure 3:
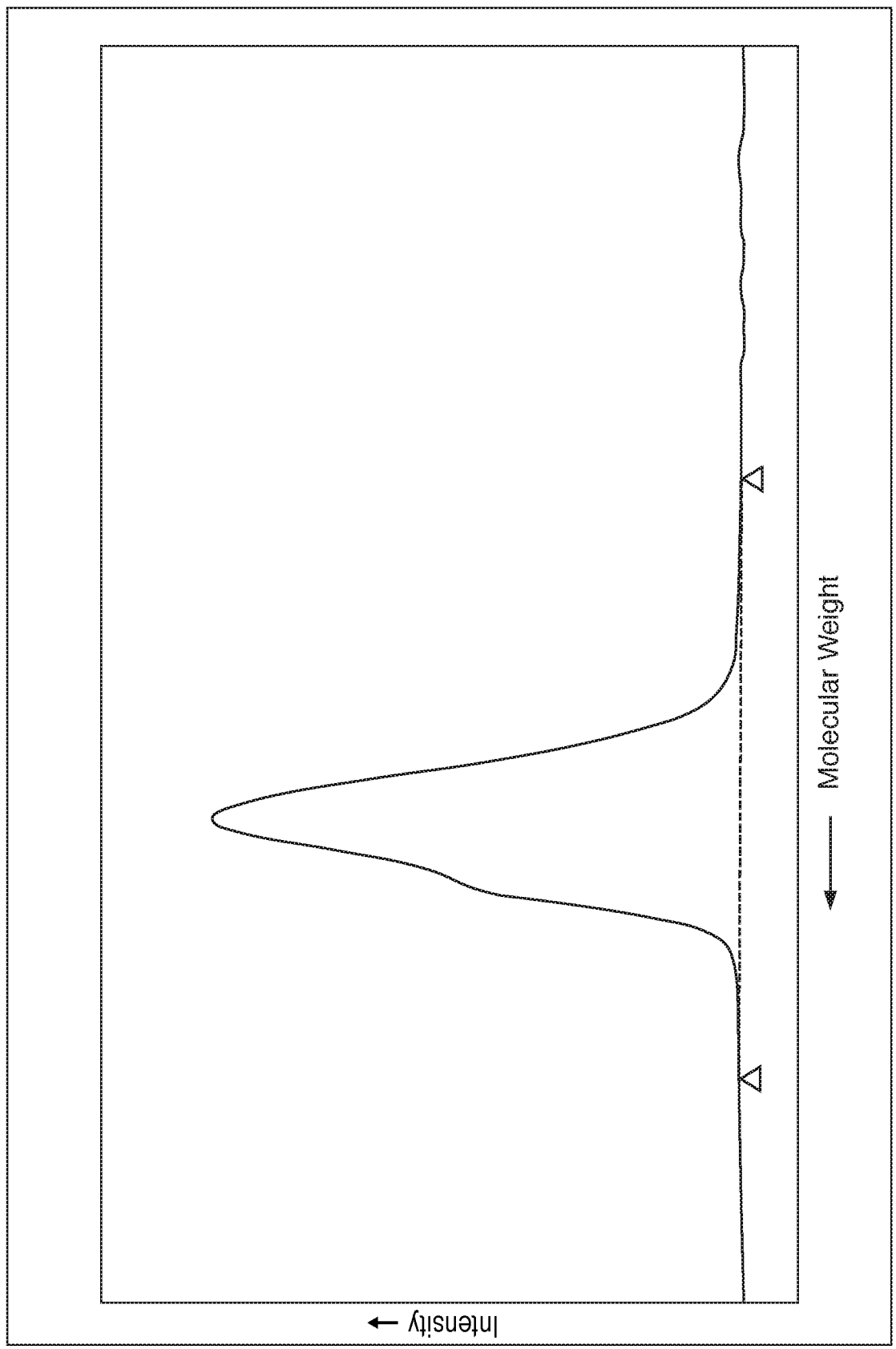
FIG. 3 is a GPC illustrating the molecular weight distribution of a product prepared by a prior art process with no pre-CAOS charge and a 5 weight percent non-CAOS cap.

To the 35 L reactor described above, 2500 grams of a 6000 MW triol ($S_t$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. Propylene oxide (100 g) was charged to activate the catalyst. The pressure increased to 5 psia and then steadily decreased, indicating the catalyst was active. When the pressure reached 3 psia, the PO feed was restarted and ramped to 48.9 g/min over 20 minutes. After an additional 150 grams of propylene oxide was fed glycerin, as the continuously added starter ($S_c$), was started and ramped with the PO feed to a feed rate of 0.79 g/min. The glycerin, as $S_c$, started after 250 g of PO was fed or 1.45 wt % of the total PO to be fed (250 g/17232 g). The glycerin was fed at a ratio of 1.6 wt. % based on the PO feed rate (0.79 g/min Gly/48.9 g/min PO). The glycerin and PO feeds continued until the glycerin feed met the target weight of 268 grams. At the targeted glycerin/PO ratio of 1.6% the target was reached after 16232 grams of PO was fed or 94% of the total PO. The remaining 1000 grams of PO continued at the feed rate of 48.9 g/min until the final PO target of 17232 grams was reached. The feeding of 1000 grams of PO without the glycerin feed corresponds to a "non-CAOS" cap of 5 wt. % based on the total batch weight (1000 g/20000 g batch). The final product (P) was inhibited with 160 ppm Irganox E-201. The final product (P) had a hydroxyl number of 28.2 mg KOH/g polyol, a viscosity of 1379 cst (adjusted viscosity of 1390, adjusting to a hydroxyl number of 28.0 mg KOH/g polyol) and a polydispersity index (Mw/Mn) of 1.076. FIG. 3 illustrates the molecular weight distribution of this product. The figure demonstrates the high molecular weight shoulder present when the product (P) was made with no "pre-CAOS" charge ($S_x$) to the polyoxyalkylene polyol substance ($S_t$) of the starter mixture and with a 5 weight percent "non-CAOS" cap.

Example 8

Figure 4:
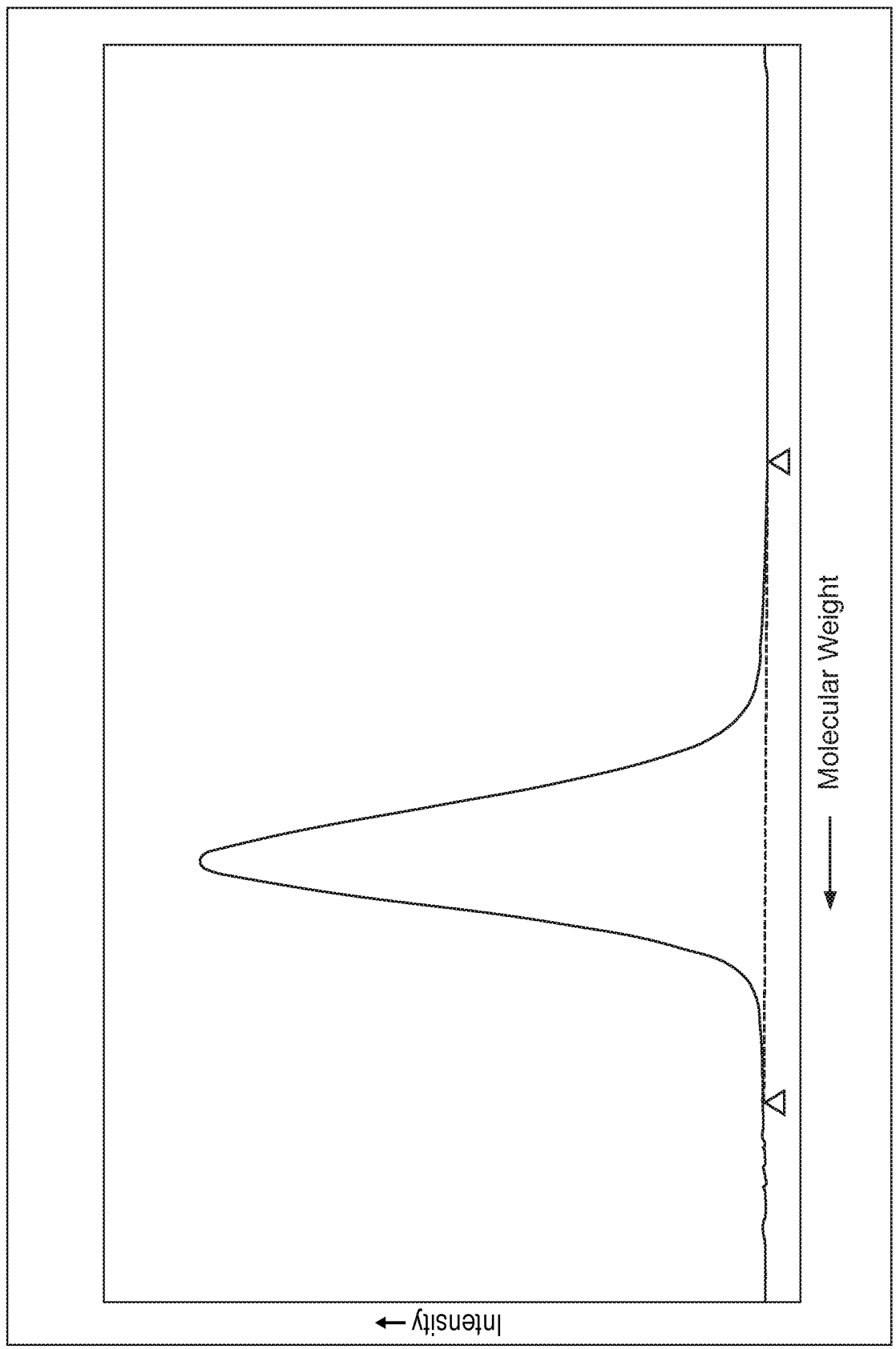
FIG. 4 is a GPC illustrating the molecular weight distribution of a product prepared in accordance with the present invention with a pre-CAOS charge and a 5 weight percent non-CAOS cap.

To the 35 L reactor described above, 2504 grams of a 6000 MW triol ($S_t$) made via a semi-batch process using Catalyst 12.5 grams of glycerin ($S_x$) (0.5 wt. % glycerin based on the weight of the polyoxyalkylene polyol substance ($S_t$) of the starter mixture) were charged to the polyoxyalkylene polyol substance ($S_t$) of the starter and catalyst mixture. The 12.5 grams of glycerin represents a 0.5 wt. % "pre-CAOS" charge. Propylene oxide (100 g) was charged to activate the catalyst. The pressure increased to 15 psia and then steadily decreased, indicating the catalyst was active. When the pressure reached 5 psia, the PO feed was restarted and ramped to 49.0 g/min over 20 minutes. After an additional 25 grams of propylene oxide was fed glycerin, as the continuously added starter ($S_c$), was started and ramped with the PO feed to a feed rate of 0.75 g/min. The glycerin, as $S_c$, started after 125 g of PO was fed or 0.72 wt % of the total PO to be fed (125 g/17260 g). The glycerin was fed at a ratio of 1.5 wt. % based on the PO feed rate (0.75 g/min Gly/49 g/min PO). The glycerin and PO feeds continued until the glycerin feed met the target weight of 256 grams. At the targeted glycerin/PO ratio of 1.5% the target was reached after 16258 grams of PO was fed or 94% of the total PO. The remaining 1002 grams of PO continued at the feed rate of 49.0 g/min until the final PO target of 17260 grams was reached. The feeding of 1002 grams of PO without the glycerin feed corresponds to a "non-CAOS" cap of 5 weight percent based on the total batch weight (1002 g/20032 g batch). The final product (P) was inhibited with 160 ppm Irganox E-201. The final product (P) had a hydroxyl number of 27.9 mg KOH/g, a viscosity of 1291 cSt (adjusted viscosity of 1285 cSt, adjusting to a hydroxyl number of 28.0 mg KOH/g polyol) and a polydispersity index (Mw/Mn) of 1.053. FIG. 4 illustrates the molecular weight distribution of the product of this example. The product (P) was made with a "pre-CAOS" charge ($S_x$) to the polyoxyalkylene polyol substance ($S_t$) of the starter mixture and with a 5 weight percent "non-CAOS" cap. The "pre-CAOS" charge eliminated the shoulder on the high molecular weight side of the molecular weight distribution giving a narrower, more uniform distribution. The viscosity was also lower than Comparative Example 7.

Example 9

To the 35 L reactor described above, 2500 grams of a 6000 MW triol ($S_t$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.5 grams of glycerin represents a 0.5 wt. % "pre-CAOS" charge. Propylene oxide (100 g) was charged to activate the catalyst. The pressure increased to 15 psia and then steadily decreased, indicating the catalyst was active. When the pressure reached 3 psia, the PO feed was restarted and ramped to 48.9 g/min over 20 minutes. After an additional 150 grams of propylene oxide was fed glycerin, as the continuously added starter ($S_c$), was started and ramped with the PO feed to a feed rate of 0.92 g/min. The glycerin, as $S_c$, started after 250 g of PO was fed or 1.45 wt % of the total PO to be fed (250 g/17232 g). The glycerin was fed at a ratio of 1.9 wt. % based on the PO feed rate (0.92 g/min Gly/48.9 g/min PO). The glycerin and PO feeds continued until the glycerin feed met the target weight of 255 grams. At the targeted glycerin/PO ratio of 1.9% the target was reached after 13232 grams of PO was fed or 77% of the total PO. The remaining 4000 grams of PO continued at the feed rate of 48.9 g/min until the final PO target of 17232 grams was reached. The feeding of 4000 grams of PO without the glycerin feed corresponds to a "non-CAOS" cap of 20 weight percent based on the total batch weight (4000 g/20000 g batch). The final product (P) was inhibited with 160 ppm Irganox E-201. The final product (P) had a hydroxyl number of 28.5 mg KOH/g, a viscosity of 1250 cSt (adjusted viscosity of 1278 cSt, adjusting to a hydroxyl number of 28.0 mg KOH/g polyol) and a polydispersity index (Mw/Mn) of 1.058. The product (P) of this example was made with a "pre-CAOS" charge ($S_x$) to the polyoxyalkylene polyol substance ($S_i$) of the starter mixture and with a 20 weight percent "non-CAOS" cap. A low viscosity product was attained.

Example 10

To the 35 L reactor described above, 2513 grams of a 6000 MW triol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.6 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.6 grams of glycerin represents a 0.5 wt. % "pre-CAOS" charge. Propylene oxide (101 g) was charged to activate the catalyst. The pressure increased to 14 psia and then steadily decreased, indicating the catalyst was active. When the pressure reached 6 psia, the PO feed was restarted and ramped to 49.2 g/min over 20 minutes. After an additional 528 grams of propylene oxide was fed glycerin, as the continuously added starter ($S_c$), was started and ramped with the PO feed to a feed rate of 0.92 g/min. The glycerin, as $S_c$, started after 629 g of PO was fed or 3.6 wt % of the total PO to be fed (629 g/17322 g). The glycerin was fed at a ratio of 1.9 wt. % based on the PO feed rate (0.92 g/min Gly/49.2 g/min PO). The glycerin and PO feeds continued until the glycerin feed met the target weight of 257 grams. At the targeted glycerin/PO ratio of 1.9% the target was reached after 13302 grams of PO was fed or 77% of the total PO. The remaining 4020 grams of PO continued at the feed rate of 49.2 g/min until the final PO target of 17322 grams was reached. The feeding of 4020 grams of PO without the glycerin feed corresponds to a "non-CAOS" cap of 20 weight percent based on the total batch weight (4020 g/20104 g batch). The final product (P) was inhibited with 160 ppm Irganox E-201. The final product (P) had a hydroxyl number of 27.8 mg KOH/g, a viscosity of 1342 cSt (adjusted viscosity of 1331 cSt, adjusting to a hydroxyl number of 28.0 mg KOH/g polyol) and a polydispersity index (Mw/Mn) of 1.064. The product (P) of this example was made with a "pre-CAOS" charge ($S_x$) to the polyoxyalkylene polyol substance ($S_i$) of the starter mixture and with a 20 weight percent "non-CAOS" cap. A low viscosity product was attained.

Example 11

To the 35 L reactor described above, 2508 grams of a 6000 MW triol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.5 grams of glycerin represents a 0.5 wt. % "pre-CAOS" charge. Propylene oxide (100 g) was charged to activate the catalyst. The pressure increased to 14 psia and then steadily decreased, indicating the catalyst was active. When the pressure reached 3 psia, the PO feed was restarted and ramped to 49.1 g/min over 20 minutes. After an additional 150 grams of propylene oxide was fed glycerin, as the continuously added starter ($S_c$), was started and ramped with the PO feed to a feed rate of 1.8 g/min. The glycerin, as $S_c$, started after 250 g of PO was fed or 1.45 wt % of the total PO to be fed (250 g/17287 g). The glycerin was fed at a ratio of 3.7 wt % based on the PO feed rate (1.8 g/min Gly/49.1 g/min PO). The glycerin and PO feeds continued until the glycerin feed met the target weight of 256 grams. At the targeted glycerin/PO ratio of 3.7% the target was reached after 7254 grams of PO was fed or 42% of the total PO. The remaining 10033 grams of PO continued at the feed rate of 49.1 g/min until the final PO target of 17287 grams was reached. The feeding of 10033 grams of PO without the glycerin feed corresponds to a "non-CAOS" cap of 50 weight percent based on the total batch weight (10033 g/20064 g batch). The final product (P) was inhibited with 160 ppm Irganox E-201. The final product (P) had a hydroxyl number of 27.7 mg KOH/g, a viscosity of 1237 cSt (adjusted viscosity of 1220 cSt, adjusting to a hydroxyl number of 28.0 mg KOH/g polyol) and a polydispersity index (Mw/Mn) of 1.072. The product (P) of this example was prepared with a "pre-CAOS" charge ($S_x$) to the polyoxyalkylene polyol substance ($S_i$) of the starter mixture and with a 50 weight percent "non-CAOS" cap. A low viscosity product was attained.

Example 12

To the 35 L reactor described above, 2510 grams of a 6000 MW triol ($S_i$) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.6 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.6 grams of glycerin represents a 0.5 wt. % "pre-CAOS" charge. Propylene oxide (100 g) was charged to activate the catalyst. The pressure increased to 14 psia and then steadily decreased, indicating the catalyst was active. When the pressure reached 3 psia, the PO feed was restarted and ramped to 49.1 g/min over 20 minutes. After an additional 527 grams of propylene oxide was fed glycerin, as the continuously added starter ($S_c$), was started and ramped with the PO feed to a feed rate of 1.6 g/min. The glycerin, as $S_c$, started after 627 g of PO was fed or 3.6 wt % of the total PO to be fed (627 g/17301 g). The glycerin was fed at a ratio of 3.3 wt % based on the PO feed rate (1.6 g/min Gly/49.1 g/min PO). The glycerin and PO feeds continued until the glycerin feed met the target weight of 256 grams. At the targeted glycerin/PO ratio of 3.6% the target was reached after 7261 grams of PO was fed or 42% of the total PO. The remaining 10040 grams of PO continued at the feed rate of 49.1 g/min until the final PO target of 17301 grams was reached. The feeding of 10040 grams of PO without the glycerin feed corresponds to a "non-CAOS" cap of 50 weight percent based on the total batch weight (10040 g/20080 g batch). The final product (P) was inhibited with 160 ppm Irganox E-201. The final product (P) had a hydroxyl number of 27.6 mg KOH/g, a viscosity of 1325 cSt (adjusted viscosity of 1303 cSt, adjusting to a hydroxyl number of 28.0 mg KOH/g polyol) and a polydispersity index (Mw/Mn) of 1.06. The product (P) of this example was prepared with a "pre-CAOS" charge ($S_x$) to the polyoxyalkylene polyol substance ($S_i$) of the starter mixture and with a 50 weight percent "non-CAOS" cap. A low viscosity product was attained.

introduced via a dip tube or to the liquid phase for 30 minutes. After the nitrogen was stopped, 12.5 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.5 grams of glycerin represents a 0.5 wt. % "pre-CAOS" charge. Propylene oxide (91 g) and ethylene oxide (9 g) were charged to activate the catalyst. The pressure increased to 17 psia and then steadily decreased, indicating the catalyst was active. When the pressure reached 5 psia, the PO and EO feeds were restarted and ramped to 66.5 g/min for PO and 7.8 g/min for EO over 20 minutes. After an additional 250 grams of PO+EO were fed glycerin, as the continuously added starter ($S_c$), was started and ramped with the PO+EO feeds to a feed rate of 1.7 g/min. The glycerin, as $S_c$, started after 350 g of PO+EO was fed or 2.0 wt % of the total PO+EO to be fed (350 g/[15404 g+1798 g]). The glycerin was fed at a ratio of 2.2 wt. % based on the PO+EO feed rate (1.7 g/min Gly/(66.5 g/min PO+7.8 g/min EO)). The glycerin and PO+EO feeds continued until the glycerin feed met the target weight of 265 grams. At the targeted glycerin/PO+EO ratio of 2.2% the target was reached after 12183 grams of PO+EO was fed or 71% of the total PO+EO. The remaining 5019 grams of PO+EO continued at the feed rate of 66.5 g/min PO and 7.8 g/min EO until the final PO target of 15404 grams and the final EO target of 1798 grams were reached. The feeding of 5019 grams of PO+EO without the glycerin feed corresponds to a "non-CAOS" cap of 25 weight percent based on the total batch weight (5019 g/19976 g batch). The final product (P) was inhibited with 160 ppm Irganox E-201. The final product (P) had a hydroxyl number of 28.6 mg KOH/g, a viscosity of 1264 cSt (adjusted viscosity of 1230 cSt, adjusting to a hydroxyl number of 29.0 mg KOH/g polyol) and a polydispersity index (Mw/Mn) of 1.086. The product (P) of this example was made with a "pre-CAOS" charge ($S_x$) to the polyoxyalkylene polyol substance ($S_i$) of the starter mixture and with a 25 weight percent "non-CAOS" cap.

TABLE 2

|  | Comp. Ex. 7 | Ex. 8 | Ex. 9 | Ex. 10 | Ex. 11 | Ex. 12 |
|---|---|---|---|---|---|---|
| Pre-CAOS, wt. % of Addition of ($S_x$) in step α | 0 | 0.5 | 0.5 | 0.5 | 0.5 | 0.5 |
| Non-CAOS Cap, wt. % | 5 | 5 | 20 | 20 | 50 | 50 |
| Wt. % of Oxide of Total Feed at Non-CAOS Cap, wt. % | 94 | 94 | 77 | 77 | 42 | 42 |
| $S_c$ wt./Oxide wt. Ratio, % | 1.6 | 1.5 | 1.9 | 1.9 | 3.7 | 3.3 |
| Hydroxyl Number[1] (mg KOH/g polyol) | 28.2 | 27.9 | 28.5 | 27.8 | 27.7 | 27.6 |
| Viscosity[2] (cSt @ 25° C.) | 1379 | 1291 | 1250 | 1342 | 1237 | 1325 |
| OH# Adjusted Viscosity (cSt @ 25° C.)[3] | 1390 | 1285 | 1278 | 1331 | 1220 | 1303 |
| Polydispersity (Mw/Mn)[4] | 1.076 | 1.053 | 1.058 | 1.064 | 1.072 | 1.06 |

[1]measured in accordance with ASTM-D4274-11
[2]measured in accordance with ASTM D-4878-15
[3]adjusted to target value (28.0 mg KOH/g) by using measured OH# and measured viscosity and linearly increasing viscosity when the measured OH# is greater than target (MW or EQ is less than target so MW or EQ must increase to reach target therefore viscosity increases) and linearly decreasing viscosity when the measured OH# is less than target (MW or EQ is greater than target so MW or EQ must decrease to reach target therefore viscosity decreases)
[4]measured in accordance with DIN 5567201

Example 13

To the 35 L reactor described above, 2497 grams of a 5800 MW trial ($S_i$) with 9% ethylene oxide (EO added as a mixed block, weight % based on the total weight) made via a semi-batch process using Catalyst A and 0.6 grams of Catalyst A were charged. This mixture was heated to 130° C. Vacuum was applied to a level of 0.1 psia and nitrogen was Example 14

To the 35 L reactor described above, 2480 grams of a 5800 MW triol ($S_i$) with 9% ethylene oxide (EO added as a mixed block, weight % based on the total weight) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.4 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.4 grams of glycerin represents a 0.5 wt. % "pre-CAOS" charge. Propylene oxide (113 g) and ethylene oxide (11 g) were charged to activate the catalyst. The pressure increased to 25 psia and then steadily decreased, indicating the catalyst was active. When the pressure reached 5 psia, the PO and EO feeds were restarted and ramped to 66.0 g/min for PO and 7.7 g/min for EO over 20 minutes. After an additional 248 grams of PO+EO were fed glycerin, as the continuously added starter ($S_c$), was started and ramped with the PO+EO feeds to a feed rate of 2.5 g/min. The glycerin, as $S_c$, started after 372 g of PO+EO was fed or 2.2 wt % of the total PO+EO to be fed (372 g/[15299 g+1786 g]). The glycerin was fed at a ratio of 3.4 wt. % based on the PO+EO feed rate (2.5 g/min Gly/(66.0 g/min PO+7.7 g/min EO)). The glycerin and PO+EO feeds continued until the glycerin feed met the target weight of 263 grams. At the targeted glycerin/PO+EO ratio of 3.4% the target was reached after 8157 grams of PO+EO was fed or 48% of the total PO+EO. The remaining 8928 grams of PO+EO continued at the feed rate of 66.0 g/min PO and 7.7 g/min EO until the final PO target of 15299 grams and the final EO target of 1786 grams were reached. The feeding of 8928 grams of PO+EO without the glycerin feed corresponds to a "non-CAOS" cap of 45 weight percent based on the total batch weight (8928 g/19840 g batch). The final product (P) was inhibited with 160 ppm Irganox E-201. The final product (P) had a hydroxyl number of 28.4 mg KOH/g, a viscosity of 1271 cSt (adjusted viscosity of 1220 cSt, adjusting to a hydroxyl number of 29.0 mg KOH/g polyol) and a polydispersity index (Mw/Mn) of 1.106. The product (P) of this example was made with a "pre-CAOS" charge ($S_x$) to the polyoxyalkylene polyol substance ($S_i$) of the starter mixture and with a 45 weight percent "non-CAOS" cap.

Example 15

To the 35 L reactor described above, 2500 grams of a 5800 MW triol ($S_i$) with 9% ethylene oxide (EO added as a mixed block, weight % based on the total weight) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.5 grams of glycerin represents a 0.5 wt. % "pre-CAOS" charge. Propylene oxide (114 g) and ethylene oxide (11 g) were charged to activate the catalyst. The pressure increased to 15 psia and then steadily decreased, indicating the catalyst was active. When the pressure reached 5 psia, the PO and EO feeds were restarted and ramped to 43.7 g/min for PO and 5.2 g/min for EO over 20 minutes. After an additional 250 grams of PO+EO were fed glycerin, as the continuously added starter ($S_c$), was started and ramped with the PO+EO feeds to a feed rate of 1.07 g/min. The glycerin, as $S_c$, started after 375 g of PO+EO was fed or 2.2 wt % of the total PO+EO to be fed (375 g/[15403 g+1820 g]). The glycerin was fed at a ratio of 2.2 wt. % based on the PO+EO feed rate (1.07 g/min Gly/(43.7 g/min PO+5.2 g/min EO)). The glycerin and PO+EO feeds continued until the glycerin feed met the target weight of 265 grams. At the targeted glycerin/PO+EO ratio of 2.2% the target was reached after 12223 grams of PO+EO was fed or 71% of the total PO+EO. The remaining 5000 grams of PO+EO continued at the feed rate of 43.7 g/min PO and 5.2 g/min EO until the final PO target of 15403 grams and the final EO target of 1820 grams were reached. The feeding of 5000 grams of PO+EO without the glycerin feed corresponds to a "non-CAOS" cap of 25 weight percent based on the total batch weight (5000 g/20000 g batch). The final product (P) was inhibited with 160 ppm Irganox E-201. The final product (P) had a hydroxyl number of 29.3 mg KOH/g, a viscosity of 1203 cSt (adjusted viscosity of 1229 cSt, adjusting to a hydroxyl number of 29.0 mg KOH/g polyol) and a polydispersity index (Mw/Mn) of 1.059. The product (P) of this example was prepared with a "pre-CAOS" charge ($S_x$) to the polyoxyalkylene polyol substance ($S_i$) of the starter mixture and with a 25 weight percent "non-CAOS" cap.

Example 16

To the 35 L reactor described above, 2511 grams of a 5800 MW triol ($S_i$) with 9% ethylene oxide (EO added as a mixed block, weight % based on the total weight) made via a semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. After the nitrogen was stopped 12.6 grams of glycerin ($S_x$) (0.5 wt. % glycerin based on the weight of the polyoxyalkylene polyol substance ($S_i$) of the starter mixture) were charged to the polyoxyalkylene polyol substance ($S_i$) of the starter and catalyst mixture. The 12.6 grams of glycerin represents a 0.5 wt. % "pre-CAOS" charge. Propylene oxide (114 g) and ethylene oxide (11 g) were charged to activate the catalyst. The pressure increased to 17 psia and then steadily decreased, indicating the catalyst was active. When the pressure reached 5 psia, the PO and EO feeds were restarted and ramped to 43.9 g/min for PO and 5.1 g/min for EO over 20 minutes. After an additional 251 grams of PO+EO were fed glycerin, as the continuously added starter ($S_c$), was started and ramped with the PO+EO feeds to a feed rate of 1.89 g/min. The glycerin, as $S_c$, started after 376 g of PO+EO was fed or 2.2 wt % of the total PO+EO to be fed (376 g/[15490 g+1808 g]). The glycerin was fed at a ratio of 3.8 wt. % based on the PO+EO feed rate (1.89 g/min Gly/(43.9 g/min PO+5.1 g/min EO)). The glycerin and PO+EO feeds continued until the glycerin feed met the target weight of 266 grams. At the targeted glycerin/PO+EO ratio of 3.8% the target was reached after 7255 grams of PO+EO was fed or 42% of the total PO+EO. The remaining 10043 grams of PO+EO continued at the feed rate of 43.9 g/min PO and 5.1 g/min EO until the final PO target of 15490 grams and the final EO target of 1808 grams were reached. The feeding of 10043 grams of PO+EO without the glycerin feed corresponds to a "non-CAOS" cap of 50 weight percent based on the total batch weight (10043 g/20088 g batch). The final product (P) was inhibited with 160 ppm Irganox E-201. The final product (P) had a hydroxyl number of 28.7 mg KOH/g, a viscosity of 1220 cSt (adjusted viscosity of 1195 cSt, adjusting to a hydroxyl number of 29.0 mg KOH/g polyol) and a polydispersity index (Mw/Mn) of 1.054. The product (P) of this example was prepared with a "pre-CAOS" charge ($S_x$) to the polyoxyalkylene polyol substance ($S_i$) of the starter mixture and with a 50 weight percent "non-CAOS" cap.

TABLE 3

|  | Ex. 13 | Ex. 14 | Ex. 15 | Ex. 16 |
|---|---|---|---|---|
| Pre-CAOS, wt. % of Addition of ($S_x$) in step α | 0.5 | 0.5 | 0.5 | 0.5 |
| Non-CAOS Cap, wt. % | 25 | 45 | 25 | 50 |
| Wt. % of Oxide of Total Feed at Non-CAOS Cap, wt. % | 71 | 48 | 71 | 42 |
| $S_c$ wt./Oxide wt. Ratio, % | 2.2 | 3.4 | 2.2 | 3.8 |
| Hydroxyl Number[1] (mg KOH/g polyol) | 28.6 | 28.4 | 29.3 | 28.7 |
| Viscosity[2] (cSt @ 25° C.) | 1264 | 1271 | 1203 | 1220 |
| OH# Adjusted Viscosity (cSt @ 25° C.)[3] | 1230 | 1220 | 1229 | 1195 |
| Polydispersity (Mw/Mn)[4] | 1.086 | 1.106 | 1.059 | 1.054 |

[1] measured in accordance with ASTM-D4274-11
[2] measured in accordance with ASTM D-4878-15
[3] adjusted to target value (29.0 mg KOH/g) by using measured OH# and measured viscosity and linearly increasing viscosity when the measured OH# is greater than target (MW or EQ is less than target so MW or EQ must increase to reach target therefore viscosity increases) and linearly decreasing viscosity when the measured OH# is less than target (MW or EQ is greater than target so MW or EQ must decrease to reach target therefore viscosity decreases)
[4] measured in accordance with DIN 5567201

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyoxyalkylene polyol (P) having a functionality of 2 to 8 and an hydroxyl number of from 5 mg KOH/g to 35 mg KOH/g by reaction of H-functional starter substances ($S_i$), ($S_c$) and ($S_x$) with one or more alkylene oxide(s) in the presence of a double metal cyanide catalyst (DMC), comprising
  (α) forming a starter mixture comprising said H-functional starter substances ($S_i$) and ($S_x$), and said double metal cyanide catalyst, and optionally, stripping the starter mixture under vacuum;
  (γ) continuously adding (a) an alkylene oxide to the starter mixture of step (α);
  and
  (δ) continuously adding said H-functional starter substance ($S_c$);
  wherein
  (i) steps (γ) and (δ) either start simultaneously or step (γ) starts before step (δ);
  (ii) the theoretical functionality of said H-functional starter substance ($S_i$) is identical to the theoretical functionality of said polyoxyalkylene polyol (P) and the measured hydroxyl number of said H-functional starter substance ($S_i$) is within 10% of the measured hydroxyl number of said polyoxyalkylene polyol (P);
  (iii) said H-functional starter substance ($S_x$) has an equivalent weight greater than or equal to 10 Da and less than or equal to 250 Da;
  (iv) said H-functional starter substance ($S_c$) has an equivalent weight of greater than or equal to 10 Da and less than or equal to 70 Da;
  (v) in step (δ), the continuous addition of the H-functional starter substance ($S_c$) is stopped when from 30 weight percent to 99 weight percent of the total amount of alkylene oxide added in step (γ) has been added;
  and
  (vi) said hydroxyl numbers are determined according to ASTM D4274-11.

2. The process according to claim 1, additionally comprising:
  (β) adding an activation amount of (b) an alkylene oxide to the starter mixture of step (α);
  and wherein in step (γ) the continuous addition of (a) an alkylene oxide is to the mixture formed in (β); and (v) in step (δ) the continuous addition of said H-functional starter substance ($S_c$) is stopped when from 30 weight percent to 99 weight percent of the total weight of alkylene oxide added in steps (β) and (γ) has been added.

3. The process according to claim 1, wherein (ii) the measured hydroxyl number of said H-functional starter substance ($S_i$) is within 5% of the measured hydroxyl number of the polyoxyalkylene polyol (P).

4. The process according to claim 1, wherein (v) in step (δ) the continuous addition of the H-functional starter substance ($S_c$) is stopped when from 35 to 95 weight percent of the total weight of alkyene oxide added in step (γ) is added.

5. The process according to claim 2, wherein (v) in step (δ) the continuous addition of the H-functional starter substance ($S_c$) is stopped when from 35 to 95 weight percent of the total weight of alkyene oxide added in steps (β) and (γ) is added.

6. The process according to claim 1, wherein said H-functional starter substance ($S_i$) has a functionality of about 2 to about 8, and an OH number of 5 to 35.

7. The process according to claim 1, wherein said H-functional starter substance ($S_i$) comprises a polyoxyalkylene polyol containing double metal cyanide catalyst residuals.

8. The process according to claim 7, wherein said double metal cyanide catalyst residuals were previously exposed to alkylene oxide.

9. The process according to claim 7, wherein said double metal cyanide catalyst residuals comprise a pre-activated catalyst which was previously exposed to alkylene oxide under reaction conditions.

10. The process according to claim 1, wherein said H-functional starter substance ($S_i$) comprises a polyoxyalkylene polyol which comprises an antioxidant and/or an acid.

11. The process according to claim 1, wherein said H-functional starter substance ($S_x$) has an equivalent weight of about 20 Da to about 70 Da.

12. The process according to claim 1, wherein said H-functional starter substance ($S_x$) comprises ethylene glycol, propylene glycol, butylene glycol, glycerin, water, trimethylolpropane, sorbitol, sucrose, or combinations thereof.

13. The process according to claim 1, wherein said H-functional starter substance ($S_c$) has an equivalent weight of about 30 Da to about 50 Da.

14. The process according to claim 1, wherein (a) said alkylene oxide which is continuously added in (γ) comprises propylene oxide, ethylene oxide, or combinations thereof.

15. The process according to claim 2, wherein (b) said alkylene oxide which is added in (β) comprises propylene oxide, ethylene oxide, or combinations thereof.

16. The process according to claim 1, wherein said H-functional starter substance ($S_x$) is present in an amount of from 0.1 to 2.0 weight percent, based on the weight of said H-functional starter substance ($S_i$) present in said starter mixture of step (α).

17. The process according to claim 1, wherein said H-functional starter substance ($S_x$) and said H-functional starter substance ($S_c$) are the same substance.

18. The process according to claim 1, wherein said H-functional starter substance ($S_c$) comprises ethylene glycol, propylene glycol, butylene glycol, glycerin, water, trimethylolpropane, sorbitol, sucrose, or combinations thereof.

19. The process according to claim 1, wherein said H-functional starter substance ($S_c$) additionally comprises at least one acid.

20. The process according to claim 1, wherein the resultant polyoxyalkylene polyol (P) has a functionality of from 2 to 6 and a hydroxyl number of about 10 to 35.

21. The process according to claim 1, wherein the amount of (a) alkylene oxide added in step ($\gamma$) to activate the catalyst is from 1 to 12 weight percent of the H-functional starter substance ($S_i$) present in the starter mixture of step ($\alpha$).

22. The process according to claim 2, wherein the amount of (b) alkylene oxide added in step ($\beta$) to activate the catalyst is from 1 to 12 weight percent of the H-functional starter substance ($S_i$) present in the starter mixture of step ($\alpha$).

23. The process according to claim 1, wherein ($\delta$) continuously adding said H-functional starter substance ($S_c$) starts before 4 weight percent of the total weight of alkylene oxide added from step ($\gamma$) is fed.

24. The process according to claim 2, wherein ($\delta$) continuously adding said H-functional starter substance ($S_c$) starts before 4 weight percent of the total weight of alkylene oxide added from steps ($\beta$) and ($\gamma$) is fed.

25. The process according to claim 1, wherein the resultant polyoxyalkylene polyol (P) additionally comprises an antioxidant and/or an acid.

\* \* \* \* \*